United States Patent [19]

Cairns

[11] Patent Number: 5,563,556

[45] Date of Patent: Oct. 8, 1996

[54] GEOMETRICALLY MODULATED WAVES

[75] Inventor: John P. Cairns, Townsend, Del.

[73] Assignee: Quantum Optics Corporation, St. Georges, Del.

[21] Appl. No.: 534,543

[22] Filed: Sep. 27, 1995

Related U.S. Application Data

[63] Continuation-in-part of Ser. No. 185,695, Jan. 24, 1994, Pat. No. 5,461,347.

[51] Int. Cl.$^6$ ............................... H03C 1/00; H03C 3/00
[52] U.S. Cl. .................... 332/119; 332/151; 329/316
[58] Field of Search .................................. 332/119, 103, 332/151, 152, 120, 185; 329/316, 317, 363, 364, 327

[56] References Cited

U.S. PATENT DOCUMENTS

| | | | |
|---|---|---|---|
| 3,654,488 | 4/1972 | Traub et al. | 307/237 |
| 4,521,749 | 6/1985 | Lockhart | 332/17 |
| 4,660,192 | 4/1987 | Pommato | 307/11 |
| 5,079,525 | 1/1992 | Ishikawa et al. | 332/120 |

FOREIGN PATENT DOCUMENTS

| | | | |
|---|---|---|---|
| 705946 | 3/1954 | United Kingdom | 40/5 |
| 2027563 | 2/1980 | United Kingdom . | |

OTHER PUBLICATIONS

M. A. Roy et al., Modulateurs A Transistors Bipolaires Et A Effet De Champ, vol. 24, No. 3, Jul. 1970, Paris France, pp. 256–272.

Mauro Bramanti, A Single PLL IC Allows a Double AM–FM Demodulation, Electronic Engineering, vol. 50, No. 611, Sep. 1978 London, GB, p. 27.

H. L. Maddox, A Combination AM or FM Transmitter Circuit, Technical Digest, No. 44, Oct. 1976, p. 35.

Horst Kleinmann et al., Optische Betriebssysteme für den Weitverkehr, Nachrichtentechnische Berichte, No. 3, Dec. 1986 Backnang De, pp. 95–111.

*Primary Examiner*—Robert Pascal
*Assistant Examiner*—David H. Vu
*Attorney, Agent, or Firm*—Connolly & Hutz

[57] ABSTRACT

A novel communications method for generating specific unique information containing waveforms, for geometrically modulating a signal with those waveforms, and an apparatus for generating the waveforms, geometrically modulating carrier waves with those waveforms, or broadcasting the novel waves by RF, microwave, electric cable, or fiberoptic conduits.

14 Claims, 13 Drawing Sheets

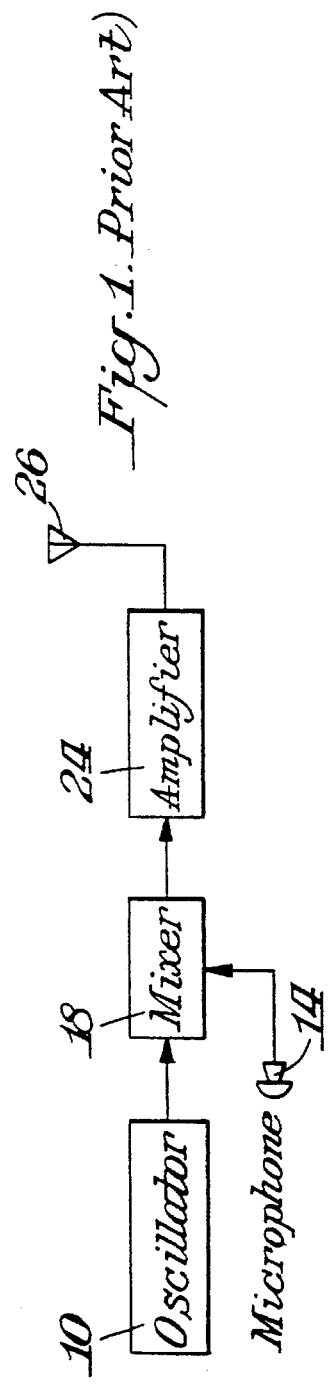
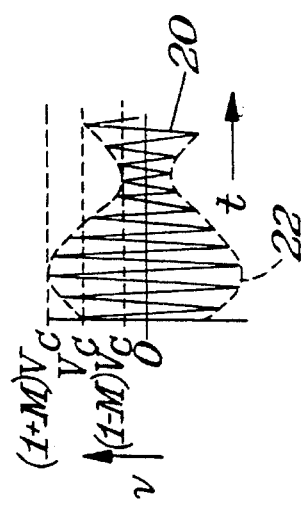
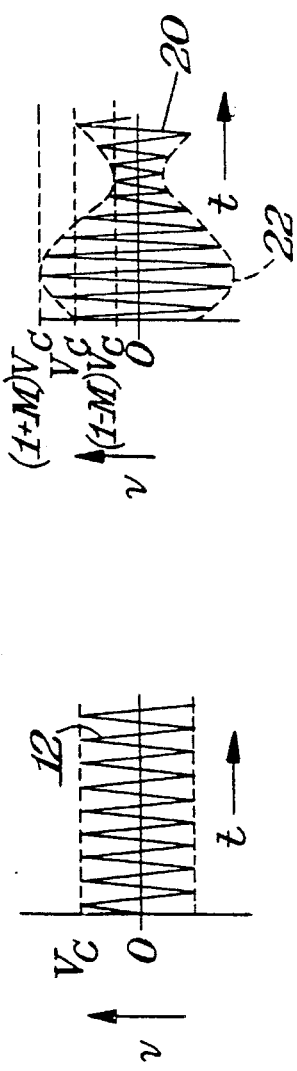
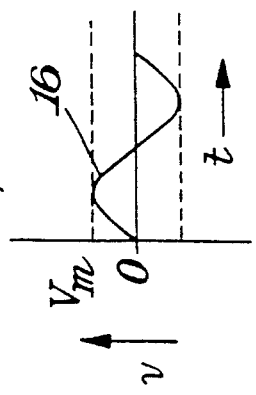
Fig. 1. (Prior Art)
Fig. 1A. (Prior Art)
Fig. 1B. (Prior Art)
Fig. 1C. (Prior Art)

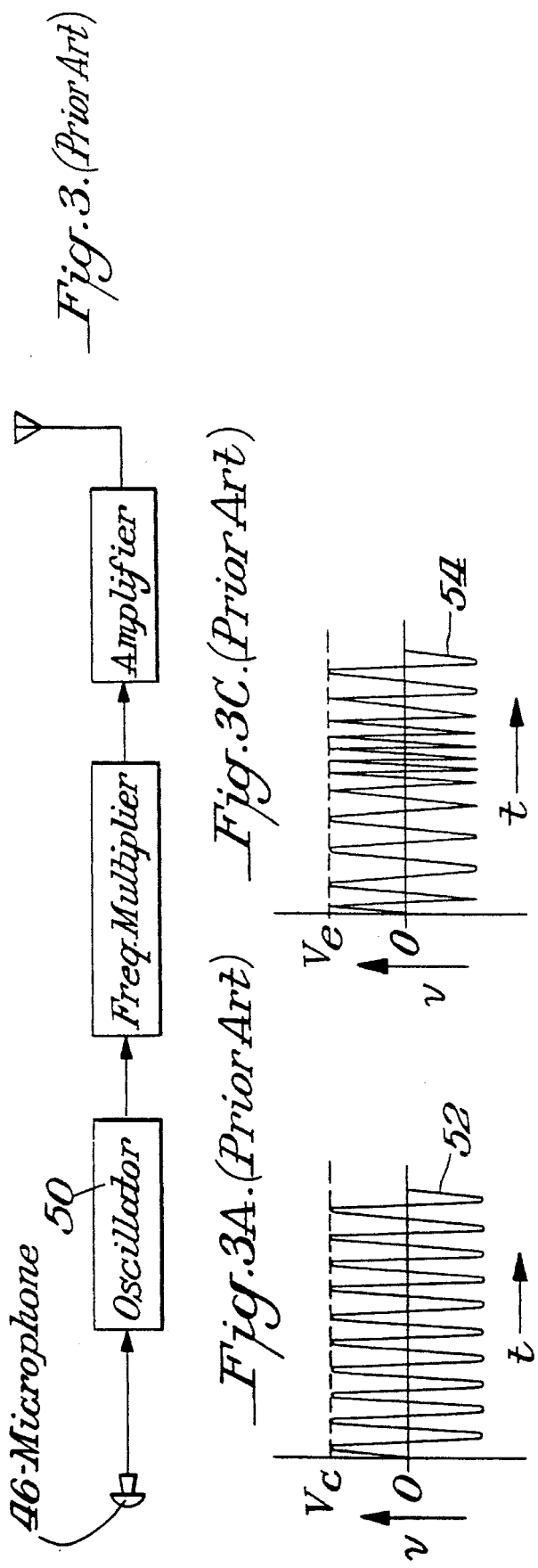

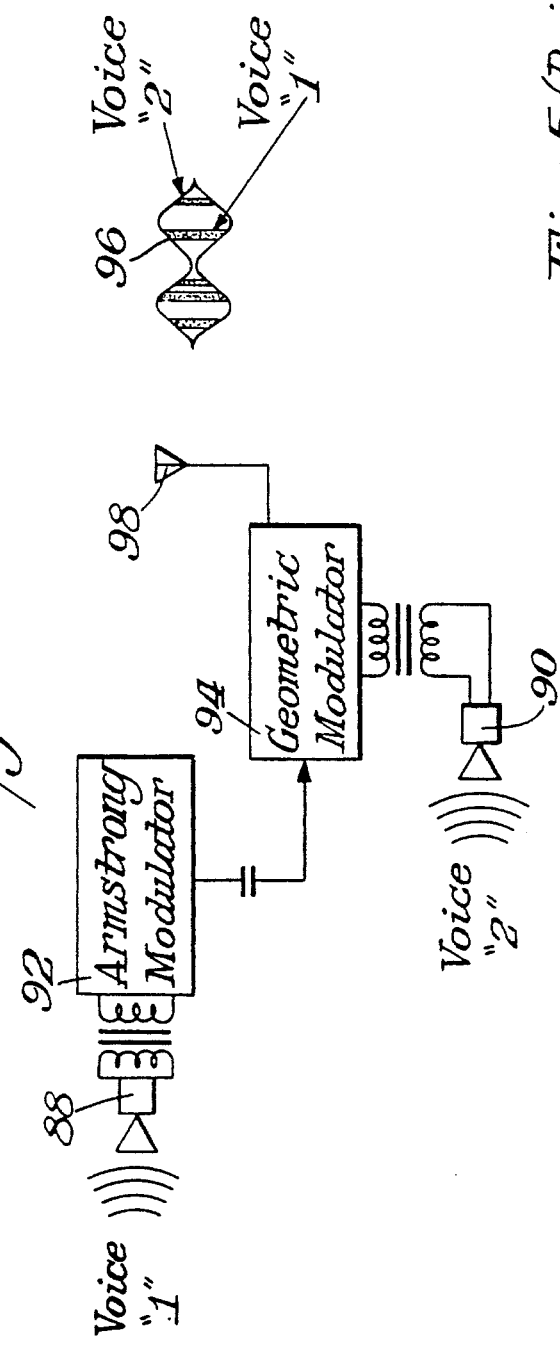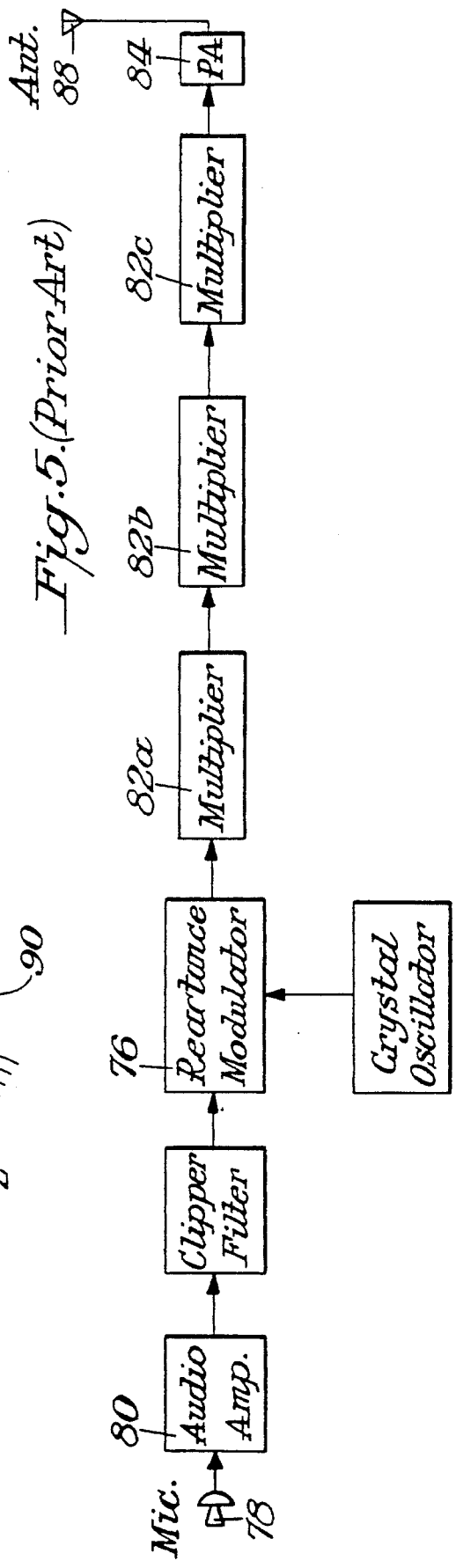

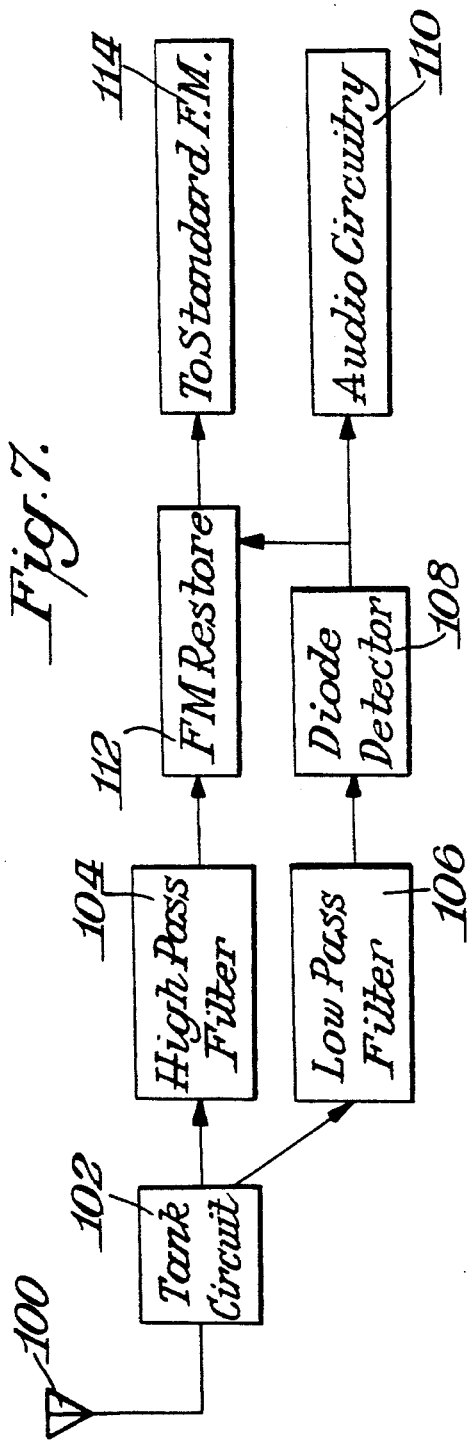
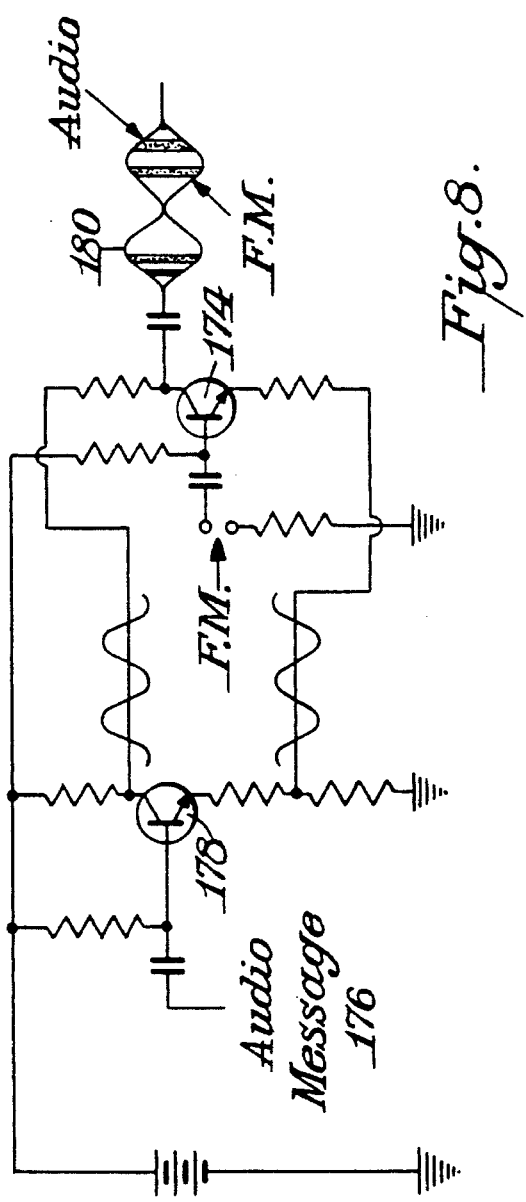

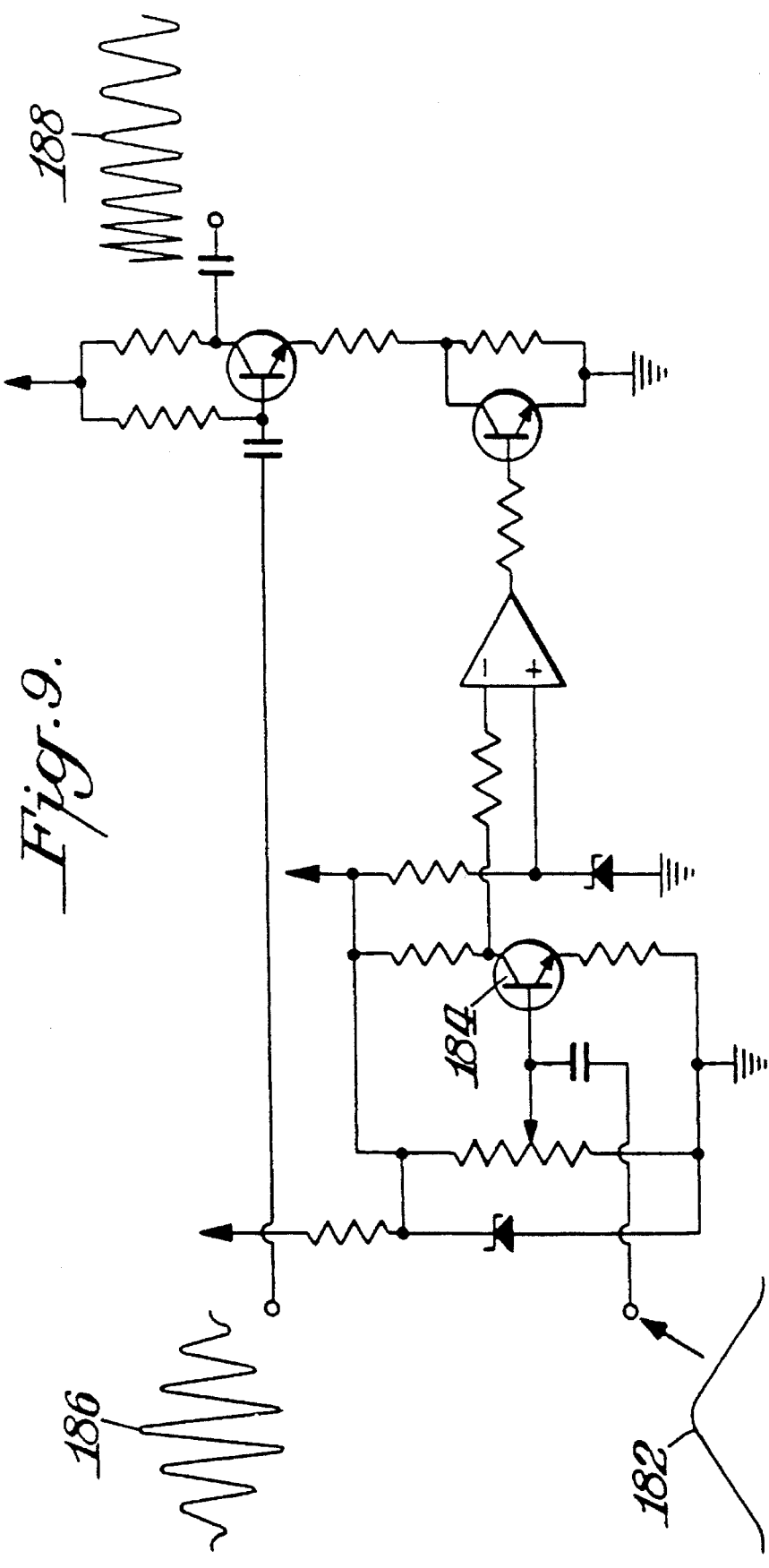

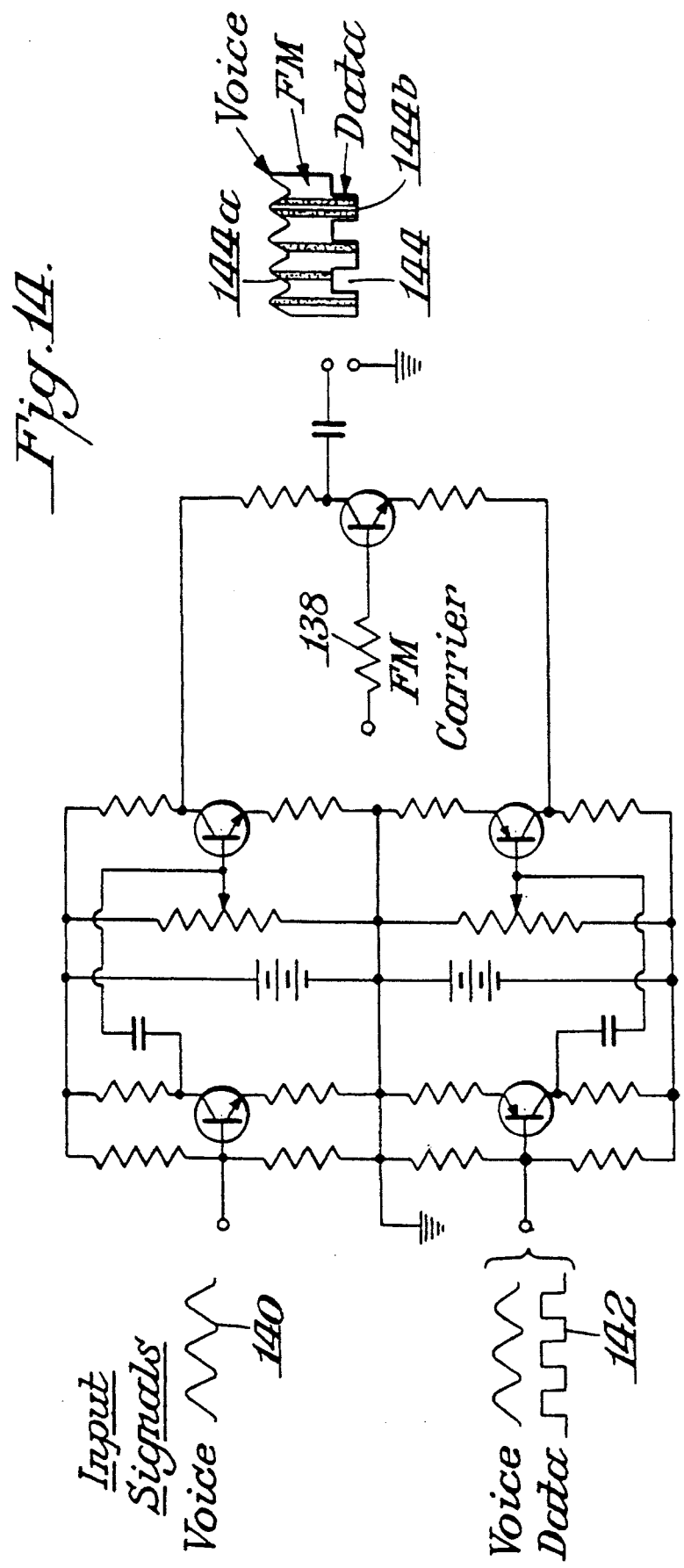

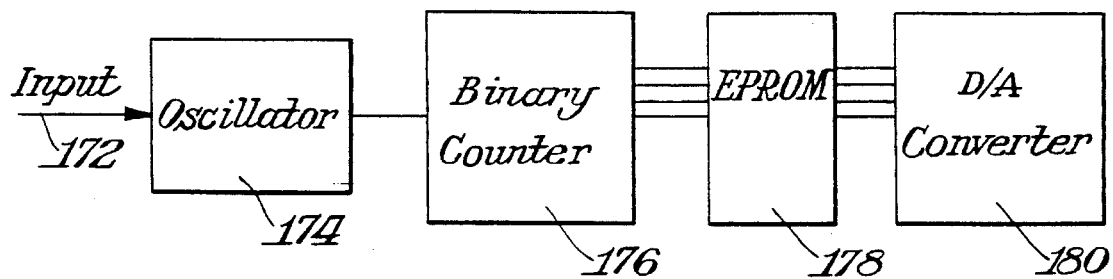
Fig. 16.
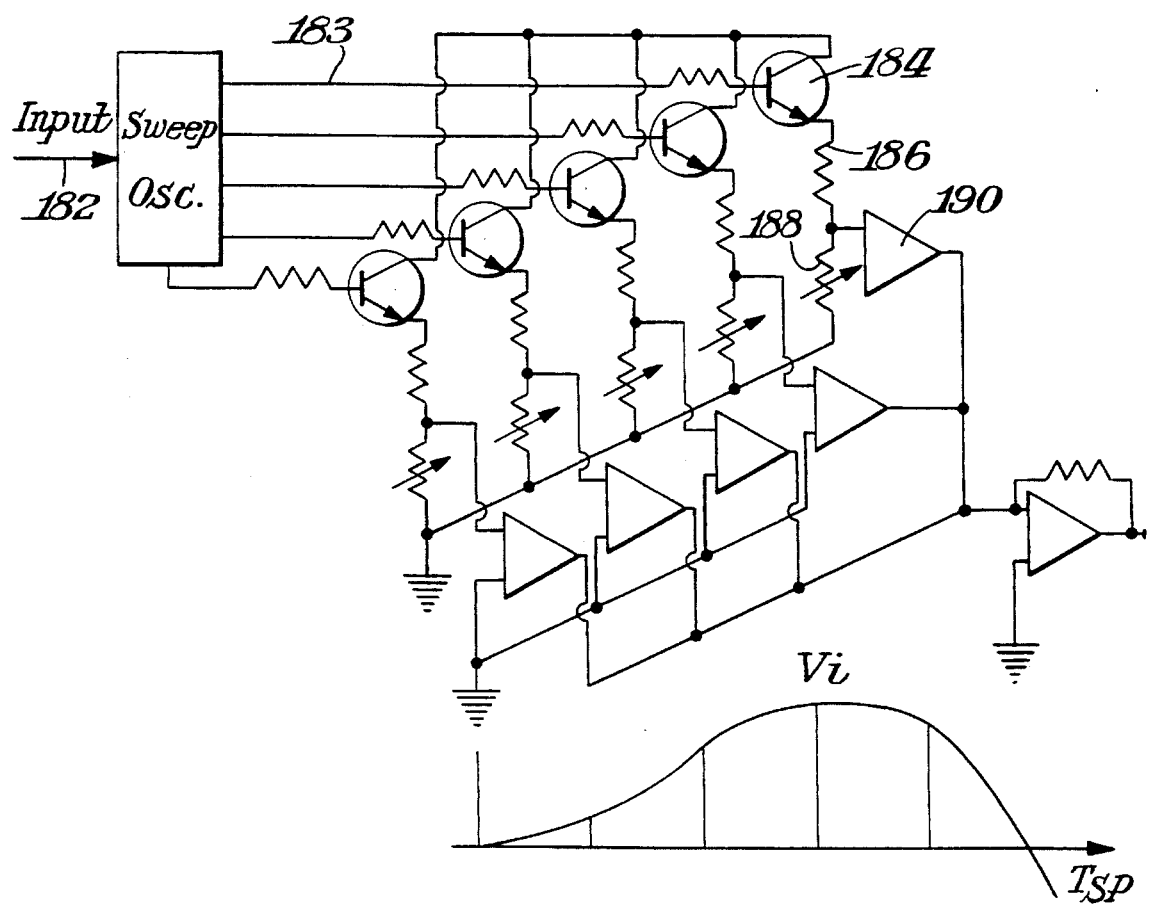
Fig. 17.
Fig. 17A.

GEOMETRICALLY MODULATED WAVES

CROSS-REFERENCE TO RELATED APPLICATIONS

This is a continuation in part of my copending application, Ser. No. 08/185,695 entitled "Apparatus and Method of Geometrically Modulating Electromagnetic Radiation and a Receiver for Decoding Geometrically Modulated Signals", filed Jan. 24, 1994, now issued as U.S. Pat. No. 5,461,347 the specification of which is incorporated herein by reference.

BACKGROUND OF THE INVENTION

1. Field of the Invention

This invention relates to an apparatus and method for geometrically modifying electromagnetic radiation to create unique waveforms generated by a signaling power supply. These waveforms have hitherto been unknown as transmission carrier waves and are useful in the transmission of data and other electromagnetic wave applications.

2. Description of the Prior Art

Radio waves are electromagnetic radiation over a defined frequency range. That part of the electromagnetic spectrum used for all forms of communication is commonly referred to as the radio spectrum.

The radio spectrum spans low frequency waves (under 10 kilohertz with a length of several kilometers) to very high frequency waves (300 gigahertz, with a length of around 1 millimeter).

The radio spectrum is considered to be a limited natural resource, and is in many instances overcrowded and subject to interference from a variety of electromagnetic transmitters competing for limited space.

Several transmission systems have been in practical use for many decades, among them continuous-wave unmodulated (CW), and various amplitude modulated (AM) and frequency modulated (FM) transmission systems. More recently developed is the so called "double modulation" or AM with pulse-width modulation.

Continuous-wave unmodulated radio signals are those used worldwide by amateur radio enthusiasts and others. This simplest of transmitters consists of a crystal oscillator and a variable frequency oscillator which provide a stable frequency. The power supply drives the oscillator, which emits an unmodulated carrier wave at a selected frequency. This signal may be alternatively connected or disconnected by a standard telegraph key, and sent through an amplifier and antenna. This, in essence, is a Morse-code transmitter.

AM and FM transmitters "modulate" a radio signal or carrier by changing a particular characteristic of the radio signal, either its amplitude by constructive or destructive interference with a lower frequency signal, or its frequency by electronic manipulation.

AM SYSTEMS

AM systems work by varying the amplitude of an RF signal in response to data input such as a microphone or audio input. Amplitude modulation is the result of the algebraic summation of the partial sums consisting of the carrier signal and a message signal. The message signal is a lower-frequency (audio and the like) signal, while the carrier is a high frequency signal generated by an oscillator. When the two signals are superposed, they interfere either destructively or constructively, causing the phenomenon known as "beats". A receiver tuned to the appropriate frequency can interpret the beat frequency and decode the audio or other data output.

The addition does not take place in a medium, rather, it takes place in the electron stream between the cathode and anode, with the introduction of the modulating signals at the grids of a traditional vacuum tube. When this modulation occurs in a transistor, it is at the P-N junction (solid state).

Amplitude modulation is a misnomer, it is better described as harmonic rearrangement, wherein the amplitude is varied by changing the harmonic content.

This traditional modulation is represented by the following equations, which equations are provided to explain the theoretical basis for traditional amplitude modulation to assist in further understanding of the applicant's invention only, and are in no way deemed to be limitations of the invention.

The first equation represents the addition of two electromagnetic waves in a vacuum tube. This summing is brought about by the thermonic work function:

$$\epsilon = \sqrt{\tau KT(A^{2_2} - A^{2_1}) - \left(\frac{A_1}{A_2}\right)^2 \phi^2(X)}$$

Providing the energy function for the summation of the waves:

$$\psi_1 = A_1 e^{i\omega_1 t}$$

and $$\psi_2 = A_2 e^{i\omega_2}$$

with scattering angle "θt", $\delta = e^{i\theta t}$, and scattering parameter "δ"

$$\beta\psi_1 + \psi_2 = \psi = A_i e^{i(\omega_1 + \theta)t} + A_2 e^{i\omega_2 t} \pm \sqrt{\sigma KT(A^{2_2} - A^{2_1}) - \left(\frac{A_1}{A_2}\right)^2 \phi^2(X)}$$

Changing the harmonic content of the waves enables the amplitudes to become equal, minimizing the energy and changing the work function to $$\epsilon = \pm i\phi(x)$$

where "x" is the paramagnetic susceptibility. The basic summation is given by:

$$\psi = A_1 e^{i(\omega_1 + \theta)t} + A_2 e^{i(\omega_2)t}$$

And wherein $A_1 = A_2 = A$ $$\psi = Ae^{i(\frac{\omega_1 + \omega_2 + \theta}{2})t} \{e^{i(\frac{\omega_1 - \omega_2 + \theta}{2})t} + e^{i(\frac{\omega_2 - \omega_1 - \theta}{2})t}\} \pm i\phi(x)$$

$$\psi = Ae^{i(\frac{\omega_1 + \omega_2 + \theta}{2})t} \{e^{i(\frac{\omega_1 - \omega_2 + \theta}{2})t} + e^{-i(\frac{\omega_1 - \omega_2 + \theta}{2})t}\} \pm i\phi(x)$$

$$\psi = Ae^{i(\frac{\omega_1 + \omega_2 + \theta}{2})t} \cos\left[\left(\frac{\omega_1 - \omega_2}{2}\right) + \frac{\omega}{2}\right] \pm i\phi(x)$$

$$\psi = 2A \left\{ \cos\left[\left(\frac{\omega_1 + \omega_2 + \theta}{2}\right)t\right] + \right.$$

$$i\sin\left[\left(\frac{\omega_1+\omega_2+\theta}{2}\right)t\right]\right\}\cos\left[\left(\frac{\omega_1-\omega_2+\theta}{2}\right)t\right]\pm i\phi(x)$$

$$\psi =$$

$$2A\left\{\cos\left[\left(\frac{\omega_1+\omega_2+\theta}{2}\right)t\right]\cos\left[\left(\frac{\omega_1-\omega_2+\theta}{2}\right)t\right]+\right.$$

$$\left.i\sin\left[\left(\frac{\omega_1+\omega_2+\theta}{2}\right)t\right]\cos\left[\left(\frac{\omega_1-\omega_2+\theta}{2}\right)t\right]\right\}\pm i\phi(x)$$

$$\psi = 2A\left\{\frac{1}{2}\cos\left[\left(\frac{\omega_1+\omega_2}{2}-\frac{\omega_1-\omega_2}{2}\right)t\right]+\right.$$

$$\frac{1}{2}\cos\left(\frac{\omega_1+\omega_2}{2}+\frac{\omega_1-\omega_2}{2}+\theta\right)t\right]+$$

$$i\sin\left[\left(\frac{\omega_1+\omega 12+\theta}{2}\right)t\right]\cos\left[\left(\frac{\omega_1-\omega_2+\theta}{2}\right)t\right]\right\}\pm$$

$$i\phi(x)$$

$$\psi = A\{\cos((\overline{\omega}-\omega_\Delta)t)+\cos(\overline{\omega}+\omega_\Delta+\theta\}+$$

$$iA\sin\left[\left(\overline{\omega}+\frac{\theta}{2}\right)t\right]\cos\left[\omega_\Delta+\frac{\theta}{2}\right)t\right]\pm i\phi(x)$$

$$\theta t = \pi - \alpha t$$

$$\psi = A\{\cos[(\overline{\omega}-\omega_\Delta)t]+\cos[(\overline{\omega}+\omega_\Delta+\alpha)t+\pi]\}+$$

$$iA\sin\left[\left(\overline{\omega}+\frac{\theta}{2}\right)t\right]\cos\left(\omega_\Delta+\frac{\theta}{2}\right)t\right]\pm i\phi(x)$$

$$\psi = A\{\cos[(\overline{\omega}-\omega_\Delta)t]-\cos[(\overline{\omega}+\omega_\Delta-\alpha)t]\}+$$

$$iA\sin\left[\left(\overline{\omega}+\frac{\theta}{2}\right)t\right]\cos\left(\omega_\Delta+\frac{\theta}{2}\right)t\right]\pm i\phi(x)$$

$$\psi = A\cos[(\overline{\omega}-\omega_\Delta)t]-A\cos[(\overline{\omega}+\omega_\Delta\alpha)t]+B\sin(\overline{\omega}t)+$$

$$iA\sin\left[\left(\overline{\omega}+\frac{\theta}{2}\right)t\right]\cos\left(\omega_\Delta+\frac{\theta}{2}\right)t\right]\pm i\phi(x)-B\sin(\overline{\omega}t)$$

The resulting modulated wave is therefore:

$$\psi = A\cos[(\overline{\omega}-\omega_\delta)t]+B\sin(\overline{\omega}t)-A\cos[(\overline{\omega}+\omega_\delta-\alpha)t]$$

and Snell's law applied:

$$i\left\{\frac{A\cos\left[\left(\omega_\delta+\frac{\omega}{2}\right)t\right]}{B}\pm\frac{\phi(x)}{\sin\left(\overline{\omega}+\frac{\theta}{2}\right)t}\right\} = \frac{\sin(\overline{\omega}t)}{\sin\left[\left(\overline{\omega}+\frac{\omega}{2}\right)t\right]}$$

Therefore, it may be seen that the resulting refractive index has a real component which is zero. This indicates that traditional amplitude modulation takes place in the electron stream (of the vacuum tube for this example).

The refractive index created in a P-N junction of a diamagnetic medium with diamagnetic dopants also exhibits a complex refractive index but whose real part is a function of the bonding of the material medium.

Traditionally, optics and radio communications are thought of as disjoint fields, however, the modulation of electromagnetic communications is an extension of the optical principles of reflection and refraction. The transition from a real non-complex geometric configuration to a viable resolution in terms of complex numbers can be assisted by an understanding of the following relationships.

Let $R_e$ and $I_m$ be abbreviations for the real part and the complex part of a complex number.

The vector z is the vector sum of x and y or $z=x+y$. The magnitude of z is given by $$z\cdot z=(x+y)\cdot(x+y)$$

or, more appropriately $$z^2=x^2+y^2+2xy\cos\theta_z$$

From the law of sines, which is $$\frac{x}{\sin\theta_x}=\frac{y}{\sin\theta_y}=\frac{z}{\sin\theta_z}$$

and substituting $$x=\frac{\sin\theta_x}{\sin\theta_y}y$$

into the equation, the following relationship is obtained:

$$z^2=\left(\frac{\sin\theta_x}{(\sin\theta_y)}\right)^2 y^2+y^2+2y^2\left(\frac{\sin\theta_x}{\sin\theta_y}\right)\cos\theta_z=$$

$$\left[\left(\frac{\sin\theta_x}{\sin\theta_y}\right)^2+2\left(\frac{\sin\theta_x}{\sin\theta_y}\right)^2+2\left(\frac{\sin\theta_x}{\sin\theta_y}\right)co\right.$$

substituting the identity $$\sin^2\theta_z+\cos^2\theta_z=1$$

yields the equation $$z^2=\left[\left(\frac{\sin\theta_x}{\sin\theta_y}\right)^2+2\left(\frac{\sin\theta_x}{\sin\theta_y}\right)\cos\theta_z+\cos^2\theta_z+\sin^2\theta_z\right]y^2$$

manipulating to yield $$z^2=\left\{\left[\frac{\sin\theta_x}{\sin\theta_y}\right)+\cos\theta_z\right]^2+\sin^2\theta_z\right\}y^2=$$

$$\left[\left(\frac{\sin\theta_x}{\sin\theta_y}\right)+\cos\theta_z\right]^2+y^2\sin^2\theta_z$$

substituting the relationship $$y=\left(\frac{\sin\theta_y}{\sin\theta_x}\right)x$$

yields the following:

$$z^2=x^2+\left(\frac{\sin\theta_y}{\sin\theta_x}\right)^2 x^2+2\left(\frac{\sin\theta_y}{\sin\theta_x}\right)x^2 so c\theta_z=$$

$$\left[\left(\frac{\sin\theta_y}{\sin\theta_x}\right)^2+2(\sin\theta_y\sin\theta_x)\cos\theta_z+1\right]x$$

substituting in the identity $$\sin^2\theta_z+\cos^2\theta_z=1$$

gives $$z^2 + \left[\left(\frac{\sin\theta_y}{\sin\theta_x}\right)^2 + \left(\frac{\sin\theta_y}{\sin\theta_x}\right)\cos\theta_z + \cos^2\theta_z + \sin^2\theta_z\right]X^2$$

$$z^2 = \left[\left(\frac{\sin\theta_y}{\sin\theta_x}\right) + \cos\theta_z\right]^2 x^2 + x^2\sin^2\theta_z$$

$$\left[\left(\frac{\sin\theta_y}{\sin\theta_x}\right) + \cos\theta_z\right]^2 x^2 + x^2\sin^2\theta_z =$$

$$\left[\left(\frac{\sin\theta_x}{\sin\theta_y}\right) + \cos\theta_z\right]^2 y^2 + y^2\sin^2\theta_z$$

$$\left[\left(\frac{\sin\theta_y}{\sin\theta_x}\right) + \cos\theta_z\right]^2 x^2 - y^2\sin^2\theta_z =$$

$$\left[\left(\frac{\sin\theta_x}{\sin\theta_y}\right) + \cos\theta_z\right]^2 y^2 - x^2\sin^2\theta_z$$

The above equation would be true for all values of x and y if:

$$\left[\left(\frac{\sin\theta_y}{\sin\theta_x}\right) + \cos\theta_z\right]^2 = -\sin^2\theta_z$$

$$\frac{\sin\theta_y}{\sin\theta_x} + \cos\theta_z = i\sin\theta_z$$

$$\cos\theta_z + i\sin\theta_z = -\frac{\sin\theta_y}{\sin\theta_x}$$

since $\Theta_x + \Theta_y + \Theta_z = \pi$; $\cos(\pi - A) = -\cos A$; $\Theta_z = \pi - (\Theta_x + \Theta_y)$; and $\sin(\pi - A) = \sin A$, $$\cos(\pi - (\theta_x + \theta_y)) - i\sin(\pi - (\theta_x + \theta_y)) =$$

$$-\cos(\theta_x + \theta_y) - i\sin(\theta_x + \theta_y) = -\frac{\sin\theta_y}{\sin\theta_x}$$

Reducing in the following steps:

$$e^{i(\theta_x + \theta_y)} = \cos(\theta_x + \theta_y) + i\sin(\theta_x + \theta_y) = \frac{\sin\theta_x}{\sin\theta_y}$$

$$\left[\frac{\sin\theta_x}{\sin\theta_y} + \cos\theta_z\right]^2 = -\sin^2\theta_z = \left[\cos\theta_z + \left(\frac{\sin\theta_x}{\sin\theta_y}\right)\right]^2$$

$$\cos\theta^2 + \left(\frac{\sin\theta_x}{\sin\theta_y}\right) = -i\sin\theta_z - \cos\theta_z - i\sin\theta_z = \frac{\sin\theta_x}{\sin\theta_y}$$

$$-\cos[\pi - (\theta_x + \theta_y)] - i\sin[\pi - (\theta_x + \theta_y)] = \frac{\sin\theta_x}{\sin\theta_y}$$

$$+\cos(\theta_x + \theta_y) - i\sin(\theta_x + \theta_y) = \frac{\sin\theta_x}{\sin\theta_y}$$

$$e^{-(\theta_x + \theta_y)]} = \cos(\theta_x + \theta_y) - i\sin(\theta_x + \theta_y) = \frac{\sin\theta_x}{\sin\theta_y}$$

As can be seen by the above relationships, traditional AM modulation is the act of modifying the amplitude of one continuous wave signal to conform to the amplitude of a second continuous wave signal by changing the harmonic content of the wave.

Again, this occurs in the electron stream of a vacuum tube, which exhibits a complex refractive index whose real component is zero, or a P-N junction in a semiconductor device whose materials have diamagnetic susceptibility and also exhibits a complex refractive index. No circuitry controls the interference with the two waves, and the geometry is that of continuous waves.

This modulation is a constructive or destructive interference brought about by the summation of continuous electromagnetic waves scattered from a wave front collision point.

Other forms of modulation do not depend on the material parameters, i.e. the refractive index or the paramagnetic or diamagnetic susceptibility. The modulation encountered in FM and other forms is a direct function of circuit elements such as a balanced modulator, filter, diode, etc. This difference requires recognition that the modulation process proceeds by virtue of discrete circuits constructed specifically to produce that form of modulation, and not from an interference phenomenon.

There exist at least three other forms of modulation which utilize combinations of amplitude modulation with other circuit generated modulation. Narrow band FM, also called inverted AM lower sideband, is a mixture of AM modulation, dependent upon wavefront collisions of continuous waves in a P-N junction and electron stream, but governed by a filter, inverter, and balanced modulator. It is an amplitude modulated wave, with an artificially (by a circuit) inverted lower sideband summed with the carrier frequency and upper sideband. The signal has higher noise immunity than the pure AM signal, although no additional data is added by this modulation.

Independent side band, also called "AM sideband manipulation" is also a mixture of AM modulation, and dependent upon wavefront collisions of continuous waves in a P-N junction and electron stream, but governed by a filter, and balanced modulator. In this instance, the carrier is diminished, and the sidebands carry the data signal. No additional data is added by this modulation.

Double modulation is commonly used in the communications industry. Double modulation first gained acceptance in the television industry for color television transmissions, followed by stereo FM, and later high-quality AM. Such modulation is carried out by first converting an amplitude varying message signal into a square wave whose duty cycle changes in proportion to the amplitude of the message signal. Among such double modulators are pulse width modulators.

In a pulse-width double modulator, a square wave is first generated, said square wave being applied to an integrator to produce a triangle wave. The triangle wave is then added to a sinusoidal message signal to produce a sinusoidally varying triangle wave which is the sum of the two waves. The sinusoidally varying triangle wave is then compared to a DC reference voltage in a comparator, and the comparator outputs a square waveform. This outputted square waveform is used in a high-level modulator to amplitude modulate the carrier signal of the AM transmission. No additional data is added by this additional modulation.

FM SYSTEMS

In an FM system, the carrier frequency is modulated by voltage fluctuations which represent data, usually voice, to be transmitted. As the voltage fluctuates, the carrier frequency changes in a fixed proportion to the voltage. This is also called "direct FM".

This modulation differs from AM in that it does not depend on wavefront collisions, i.e. is not dependent on the material environment. The modulation is achieved by a voltage controlled oscillating circuit.

Phase modulation, like FM occurs as a result of electronic manipulation, i.e, not as the result of a wavefront collision. It occurs in a balanced modulator, utilizing a phase delay and summing amplifier. Phase modulation is sometimes called "indirect FM" and improves frequency stability by modulating the frequency after the oscillator creates the carrier frequency. This reduces drift or instability arising from frequency multiplying stages.

Pulse amplitude modulation is also independent of wavefront collisions, and mixes a sine wave message signal nonlinearly with a low-duty cycle sine wave in an analog switch environment, i.e. a P-N or electron stream. A pulse amplitude converts a simple analog sine wave to a rectangular wave pulse. This is a "pure" circuit manipulation of the signal.

In pulse width modulation, no wavefront collisions are involved, and a summing amplifier controls the modulation, resulting in rectilinear pulses.

In pulse position modulation, no wavefront collisions are involved, and a pulse width modulator and timer control the modulation, resulting in square waves.

RECEIVERS

Receivers change radio-frequency signals to audio or data output signals which may be perceived or multiplied. The earliest AM receivers, generally, worked by an AM radio signal causing a current to flow in an antenna. A diode rectified the RF signals, while a capacitor defined the envelope waveform. This envelope waveform passed through the circuit as an audio signal.

Direct conversion receivers are slightly more complex AM receivers as are superheterodyne receivers for CW and SSB (single-side band) carrier. In direct conversion receivers, an incoming signal is combined with a signal generated by an internal variable-frequency oscillator. Various frequencies (including the sum and difference of the incoming and internal frequency) are generated. By manipulating the frequencies, one of the resulting frequencies is in the audible range, and can be amplified by an audio amplifier.

Superheterodyne receivers add an additional mixer to direct conversion receiver. The first mixer converts the incoming frequency to an intermediate frequency, and the remaining electronic components in the receiver are designed to be most efficient at this intermediate frequency.

FM receivers are designed in a similar manner as AM receivers, except the data detector is geared to the frequency shifts of the FM signal or phase modulated signal.

Standard FM receivers are designed to be insensitive to amplitude variation caused by an impulse-type noise. See for example, the ARRL License Manual (Available from the American Radio Relay League, Newington, Conn. 06111), Technician's Class, copyright 1989, pages 8-3 to 8-4, for an excellent summary of this feature.

Stereo FM transmission is somewhat more complex than monaural FM transmission. A stereo signal consists of a left and right audio frequency signal, which are added in linear adders. One signal is inverted in one of the adders, resulting in an audio signal which is phase shifted 180°. The common way of performing this in the art is to phase shift the right audio signal, and add the right audio signal in unshifted form in one linear adder to the left audio signal (L+R), and again add the right audio signal in shifted form to the left audio signal in another linear adder (L−R).

The shifted audio added signal is amplitude modulated onto an FM carrier in a balanced modulator which suppresses the voltage at the carrier frequency and shifts the frequency of the L+R audio signal. The L−R audio signal is added to the double modulated L+R signal. This signal then may be broadcast, with a pilot or reference signal for demodulating the signal.

Stereo signals are decoded in the reverse manner of their encoding. The signal is received and split by means of a low pass filter to the L+R signal and the modulated L−R signal. After demodulation of the L−R signal, the outputs to the left and right channels are separated, or if the receiver is monaural, the L+R signal is directly fed to the speaker. By combining the two signals after selective rectification, the left and right audio signals may be filtered and amplified. No data is added, rather left and right signals are combined.

With the large number of AM, FM, TV, satellite, and cellular communications now in service, the shrinkage of frequency space has become problematic. At present, there are approximately 100 FM stations available on the spectrum. About 20 of these are reserved for educational or nonprofit broadcast, and about 80 are for commercial broadcast service. In many areas, the frequency spectrum is full, and no more broadcast licenses can be issued.

One method of conserving bandspace which has developed is known as time-division multiplexing. Utilizing a digitalized audio input, (a pulse amplitude modulated wave), a series of flat-top square waves replaced the sinusoidal information wave. These flat-topped square waves are low-duty square waves, leaving the system inactive for up to 80% of the time.

The number of square waves required to adequately sample an audio sinusoidal wave is two times the highest analog frequency. This minimum number of samplings is far lower than that the pulse-amplitude modulated system is capable of supporting with no loss in fidelity of the signal transmitted. Thus, a time-division multiplexer can sample up to 8 and possibly more audio-type waves (depending on the message signal frequency) in a clocked sequence, and then reconstruct the full waves at the receiver end by use of a low pass filter integrator. The bandwidth required is the same as for a single signal, due to the periods of non-use of the square waves. Such a system requires intricate timing circuitry and synchronization pulses to ensure appropriate encoding and decoding. *Electronic Communications, Modulation and Transmission*, Second Edition, J. Schoenbeck, McMillan Publishing Co, New York, N.Y., 1992, provides a thorough background on the prior modulation techniques and is incorporated herein by reference.

Other proposals have been made to "piggyback" data onto already existing pathways. DePaul, in U.S. Pat. No. 4,783,699 developed a method of allowing additional information to be transmitted in a video signal. His method allowed a different form of electronic intelligence to use a preexisting pathway by amplitude modulating the horizontal synchronization pulses of a television signal. This allows the simultaneous transmission of text. However, it does not increase the available data transmission capabilities, rather, it makes existing ones more efficient by effectively using dead portions when no information would normally be transmitted.

Each of the foregoing modulation techniques, while effective for transmission purposes, suffer from the problems associated with shrinking radio frequency availability—to transmit more data as a separate data channel, more bandwidth is required. Additionally, data transmission along cable routes such as electric (copper) telephonic cables or fiber optic cables is becoming congested as the vast amounts of data transmitted grows. Dedicated satellite channels, on all frequencies including microwaves, are in great demand and extremely expensive. A solution to this most pressing problem is urgently required.

SUMMARY OF THE INVENTION

It is an object of the present invention to provide an apparatus capable of generating a novel series of waveforms which can increase the data transmission capability of an electromagnetic signal. This is done by modulation of an electromagnetic wave, or by appending at least one message signal through geometric waveform modulation to a n electromagnetic signal which has been modulated previously. This does not require cost-prohibitive additional equipment and increased complexity, or need increased bandwidth.

It is a further object to provide unique defined waveforms for use in modulating transmissions which are not subject to the drawbacks and harmonics of standard sine waves. Rather, each of these novel waves, when integrated, gives another novel wave until the fourth integration, which yields the starting wave. This waveform may be utilized in a geometric modulation system as described herein.

These and other objects are accomplished by the method and apparatus of the present invention.

The invention comprises a novel modulated signal form, and a geometrically-modulated electromagnetic radio frequency signal utilizing the novel signal form. The novel signal forms of the present invention are heretofore unknown in the art.

Geometric modulation also is heretofore unknown, and is described in detail in U.S. Pat. No. 5,461,347 as follows. As discussed above, the existing forms of modulation occur with varying degrees of human manipulation into the natural interference phenomenon known as "beats" occurring in traditional AM. This human manipulation occurs to the extent of removing the natural interference phenomenon and artificially modulating, as in FM.

Modulation as presently understood can be divided into a continuum ranging from AM, which is strictly wave-dependent, to pure digital modulation, which is a "forced" modulation arising from strictly controlled circuit construction.

The newly developed modulation, the subject of the present application, is termed "geometric modulation". It does not depend on wavefront collisions, although the geometry of the waveforms is crucial to the final modulation of the wave. The circuitry which controls the waveform modulation is a signaling power supply.

The signaling power supply generates both positive and negative voltage variations, representing and reproducing a message signal, which could be a wave train or a digitalized input. The signaling power supply may be symmetric or non-symmetric, and may be an audio or other input, limited only by its relation to the carrier wave frequency. The signaling power supply is a power supply that varies at an information rate, varying the amplitude of the primary carrier wave.

A non-symmetric signaling power supply generates a waveform (wherein the upper waveform differs from the lower waveform) which enables different types and channels of information to be carried. A symmetric power supply utilizes the same input, shifts it 90° out of phase from the upper envelope to the lower envelope, while in the asymmetric signaling power supply the upper envelope may have no relationship with the lower envelope.

Utilizing a signaling power supply increases the information which may be contained in an electromagnetic transmission by a factor of three, utilizing the applicants novel geometric modulation. The output wave of a geometrically modulated wave will have the internal wave frequency as one data signal, and the outer upper and lower waveforms as second and tertiary data signals. These additional data signals are transmitted without increasing the bandwidth and at no appreciable loss of signal quality.

Geometric modulation represents a radical departure from standard amplitude modulation. A geometric modulator utilizes a controllable asymmetric or symmetric power supply. The power supply is a power source whose voltage is able to fluctuate at an information or signal-rate frequency. This voltage variation emulates the physical appearance of a modulated wave, without actually being one. Thus, no interference phenomenon is generated which would effect the internal harmonic frequency.

A geometrically modulated waveform is surrounded by a imaginary envelope which is simulated by a relatively slow amplitude variation generated by the signaling power supply in the geometric modulator.

This geometrically modulated waveform is a departure from conventional modulation of amplitude, which utilizes the "beat" phenomenon occurring when two waveforms are superposed. The signaling power supply is regulated by the data inputted into the geometric modulator. Thus, the geometric modulator allows at least one additional independent data channel where before there was only one in the FM transmitter. As the waveform has an upper and a lower half, an asymmetric power supply may transmit at least two additional data channels.

This application concerns more specifically novel waveforms especially suited for generation and utilization in the geometric modulation apparatus.

The waves generated by the signaling power supply also must meet several criterion. The waves must not create destructive harmonics, or unduly interfere with each other.

Waves useful in this regard can be generated by a source such as a programmable chip (EPROM) which receives input from an oscillator via a binary counter. The EPROM output is converted to analog to modulate the waveform. The EPROM output may also remain digital to control the signaling power supply.

The waves generated by the present application's apparatus are fundamentally trigonometric in origin. Let us begin with Eulers identity of 1777:

$$\epsilon^{\theta i} = \cos(\theta) + i \sin(\theta)$$

Euler's identity can be seen as a special case of a larger series generated by introducing the non-linear difference equation:

$$I_{m+1} = \sqrt{A} \; \epsilon^{\theta \sqrt{I_m}}, I_o = -1$$

results in the following relationships:

For m=1

$$e^{i\theta} = \cos\theta + i \sin\theta$$

For m=2

$$\epsilon^{i^{3/2}\theta} = R(\theta) - iI(\theta) - i^{1/2}C(\theta) + i^{3/2}S(\theta)$$

For m=3

$$e^{\theta i^{7/4}} = \varepsilon_0(\theta) - \varepsilon_1(\theta)i - \varepsilon_2(\theta)i^{1/2} - \varepsilon_3(\theta)i^{3/2} +$$
$$\varepsilon_4(\theta)i^{1/4} + \varepsilon_5(\theta)i^{3/4} + \varepsilon_6(\theta)i^{5/4} + \varepsilon_7(\theta)i^{7/4}$$

going to infinity. The resulting terms of the function contain traditional trigonometric generators. As the extended functions progress, the real term approaches a square wave representation, while the others appear to be analog-type functions, but not sine or cosine functions. These are novel functions.

The detailed proof of this relationship is founded on the understanding that the recurrence relation $$I_{m+1} = \sqrt{A} \; e^\theta \sqrt{I_m}, \; I_0 = -1$$

decomposes a continuous disk into a "fibrous" disk, i.e. a polygon of $2^m$ sides. While classical geometry deals with the quadrant between 1 and $i$, the extended series deals with a segment between 1 and the square root of $-i$ and generates a polygon of $2^n$ sides. The distance between complex values approaches zero but never converges to the limit zero.

To reduce the relation to a limiting form, the following manipulation is required:

$$I_{m+1} = \sqrt{A} \; e^\theta \sqrt{I_m}, \; I_m = A^{\frac{1}{2}} e^\theta \sqrt{I_{m-1}},$$

$$I_{m-1} = A^{\frac{1}{2}} e^\theta \sqrt{I_{m-2}}$$

$$I_{m-2} = A^{\frac{1}{2}} e^\theta \sqrt{I_{m-3}}, \; I_{m-3} = A^{\frac{1}{2}} e^\theta \sqrt{I_{m-4}},$$

$$I_{m-4} = A^{\frac{1}{2}} e^\theta \sqrt{I_{m-5}}$$

$$I_{m+1} = A^{\frac{1}{2}} e^\theta \times A^{\frac{1}{4}} e^{\frac{1}{2}\theta} (I_{m-1})^{\frac{1}{4}} =$$

$$A^{\frac{1}{2}+\frac{1}{4}} e^{\theta+\frac{1}{2}\theta} (I_{m-1})^{\frac{1}{4}}$$

$$I_{m+1} = A^{\frac{1}{2}+\frac{1}{4}} e^{\theta+\frac{1}{2}\theta} \times A^{\frac{1}{8}} e^{\frac{1}{4}\theta} (I_{m-2})^{\frac{1}{8}} =$$

$$A^{\frac{1}{2}+\frac{1}{4}+\frac{1}{8}} e^{\theta+\frac{1}{2}\theta+\frac{1}{4}\theta} (I_{m-2})^{\frac{1}{8}}$$

$$I_{m+1} = A^{\frac{1}{2}+\frac{1}{4}+\frac{1}{8}} e^{\theta+\frac{1}{2}\theta+\frac{1}{4}\theta} \times A^{\frac{1}{16}} e^{\frac{1}{8}\theta} (I_{m-3})^{\frac{1}{16}}$$

$$I_{m+1} = A^{\frac{1}{2}+\frac{1}{4}+\frac{1}{8}+\frac{1}{16}} e^{\theta+\frac{1}{2}\theta+\frac{1}{4}\theta+\frac{1}{8}\theta} (I_{m-3})^{\frac{1}{16}}$$

$$I_{m+1} = A^{\frac{1}{2}+\frac{1}{2^2}+\frac{1}{2^3}+\frac{1}{2^4}+\ldots+\frac{1}{2^{m+1}}} \times$$

$$e^{1+\frac{1}{2}+\frac{1}{2^2}+\frac{1}{2^3}+\frac{1}{2^4}+\ldots+\frac{1}{2^m}} [I_0]^{\frac{1}{2^{m+1}}}$$

$$m = n - 1$$

$$s = 1 = \frac{1}{2} = \frac{1}{2^2} + \frac{1}{2^3} + \frac{1}{2^4} + \ldots + \frac{1}{2^{n-1}} =$$

$$\frac{\left(\frac{1}{2}\right)^n - 1}{\left(\frac{1}{2}\right) - 1} = 2\left[\left(\frac{1}{2}\right)^n - 1\right] = 2\left[1 - \left(\frac{1}{2}\right)^n\right]$$

$$s = 2\left(\frac{2^n - 1}{2^n}\right) = \frac{2^n - 1}{2^{n-1}}$$

$$s = 1 = \frac{1}{2} = \frac{1}{2^2} + \frac{1}{2^3} + \frac{1}{2^4} + \ldots + \frac{1}{2^{n-1}} =$$

$$\frac{\left(\frac{1}{2}\right)^n - 1}{\left(\frac{1}{2}\right) - 1} = 2\left[1 - \left(\frac{1}{2}\right)^n\right] = 2\left[\frac{2^n - 1}{2^n}\right] = \frac{2^n - 1}{2^{n-1}}$$

$$I_n = A^{\frac{1}{2s}} \times e^{s\theta} [I_0]^{\frac{1}{2^n}} = A^{(\frac{2^n-1}{2^n})} e^{(\frac{2^n-1}{2^{n-1}})\theta} [I_0]^{\frac{1}{2^n}}$$

$$I_n = A^{(1-\frac{1}{2^n})} e^{(\frac{2^n-1}{2^{n-1}})\theta} [I_0]^{\frac{1}{2^n}}, \text{ for } A = I_0$$

$$I_n = [I_0]^{1-\frac{1}{2^n}} \times [I_0]^{\frac{1}{2^n}} e^{(\frac{2^n-1}{2^{n-1}})\theta} = I_0 e^{(\frac{2^n-1}{2^{n-1}})\theta}$$

for $I_0 = -1$, $\theta = \ln|i|$, $I_n = \frac{-1}{\phi} \ln|P_n|$, $i = \sqrt{-1}$ $$\frac{-1}{\phi} \ln|P_n| = -e^{(\frac{2^n-1}{2^{n-1}})\ln|i|} = -i^{(\frac{2^n-1}{2^{n-1}})}$$

$$\frac{1}{\phi} \ln|P_n| = i^{(\frac{2^n-1}{2^{n-1}})} \text{ (also) } i \exp\left(\frac{2^n-1}{2^{n-1}}\right)$$

$$P_n^{\frac{1}{\phi}} = e^{i(\frac{2^n-1}{2^{n-1}})}$$

$$P_n = e^{\phi i(\frac{2^n-1}{2^{n-1}})}$$

The generation of the individual functions follows the following routes:

$$e^{\theta i^{3/2}} = R(\theta) - iI(\theta) - i^{1/2}C(\theta) + i^{3/2}S(\theta)$$

Interestingly, the derivative of each wave yields the next wave for the series. Or, more precisely:

$$\frac{\delta R}{\delta \theta} = -C(\theta) \; \frac{\delta I}{\delta \theta} = S(\theta) \; \frac{\delta S}{\delta \theta} = R(\theta) \; \frac{\delta C}{\delta \theta} = I(\theta)$$

For each wave of the novel four used in the instant apparatus, the formulas for their generation are as follows:

$$C(\theta) = \frac{\theta^3}{3!} - \frac{\theta^7}{7!} + \frac{\theta^{11}}{11!} - \frac{\theta^{15}}{15!} + \frac{\theta^{19}}{19!} -$$
$$\frac{\theta^{23}}{23!} + \frac{\theta^{27}}{27!} \sum_{T=0}^{\infty} (-1)^T \frac{\theta^{4T+3}}{(4T+3)!}$$

$$S(\theta) = \frac{\theta}{1!} - \frac{\theta^5}{5!} + \frac{\theta^9}{9!} - \frac{\theta^{13}}{13!} + \frac{\theta^{17}}{17!} -$$
$$\frac{\theta^{21}}{21!} + \frac{\theta^{25}}{25!} \sum_{T=0}^{\infty} (-1)^T \frac{\theta^{4T+1}}{(4T+1)!}$$

$$I(\theta) = \frac{\theta^2}{2!} - \frac{\theta^6}{6!} + \frac{\theta^{10}}{10!} - \frac{\theta^{14}}{14!} + \frac{\theta^{18}}{18!} -$$
$$\frac{\theta^{22}}{22!} + \frac{\theta^{26}}{26!} \sum_{T=0}^{\infty} (-1)^T \frac{\theta^{4T+2}}{(4T+2)!}$$

$$R(\theta) = 1 - \frac{\theta^4}{4!} + \frac{\theta^8}{8!} - \frac{\theta^{12}}{12!} + \frac{\theta^{16}}{16!} -$$
$$\frac{\theta^{20}}{20!} + \frac{\theta^{24}}{24!} \sum_{T=0}^{\infty} (-1)^T \frac{\theta^{4T}}{(4T)!}$$

The functions grow at a rate of $2^n$ and can be generated from a single input function and a serial array of electrical differential circuits. The instant invention relates to those functions which occur when n is greater than 2.

Such a quality is practical in a very important way—a priority transmission may be allowed to broadcast on $2^n$ different frequencies and channels, giving instant clear access even when the channel is crowded by transmissions.

In the current mode of utilization for communications units such as cellular phones, these functions are ideally suited to provide a wide choice of user available communication channels, and inhibits the short term fading of cellular transmissions by urban environments such as tall buildings. The use of the generated waves is far ranging, in AM, FM, and spread spectrum communications systems, robotics (especially in measurement circuits); and mobile communications including avionics, navigation, and secure communications apparati.

A more complete understanding of the invention may be had by reference to the following figures and their descriptions in conjunction with the respective waveforms and algebraic or geometric equations.

BRIEF DESCRIPTION OF THE DRAWINGS

FIG. 1 is a step-block diagram of conventional AM transmitter;

FIG. 1a is a graphic representation of a sinusoidal carrier wave;

FIG. 1b is a graphical representation of a sinusoidal modulating data signal;

FIG. 1c is a graphical representation of an amplitude modulated carrier wave;

FIG. 3 is a step-block diagram of a conventional FM transmitter;

FIG. 3a is a graphical representation of a sinusoidal carrier wave;

FIG. 3b is a graphical representation of a sinusoidal modulating data signal;

FIG. 3c is a graphical representation of a frequency-modulated carrier wave;

FIG. 5 is a step-block diagram of a conventional PM transmitter;

FIG. 6 is a step-block diagram of a transmitter apparatus constructed in accordance with the present invention;

FIG. 7 is a step block diagram of a receiver apparatus constructed in accordance with the present invention;

FIG. 8 is an electronic schematic of an signaling power supply according to the present invention;

FIG. 9 is a electronic schematic of FM restore circuitry (the geometric decoder) constructed in accordance with the present invention;

FIG. 11 is a graphical representation of a waveform generated by a preferred embodiment of the present invention;

FIG. 14 is an electronic schematic of a preferred embodiment of a transmitter according to the present invention.

FIG. 16 is a step block diagram of an apparatus for generating the novel waveforms according to the present invention.

FIG. 17 is an electronic schematic of a hard-wired apparatus for generating the novel waveforms according to the present invention.

FIG. 17A is an illustration of the waveform generated by the apparatus of FIG. 17.

DETAILED DESCRIPTION OF THE DRAWINGS

Figure 2:
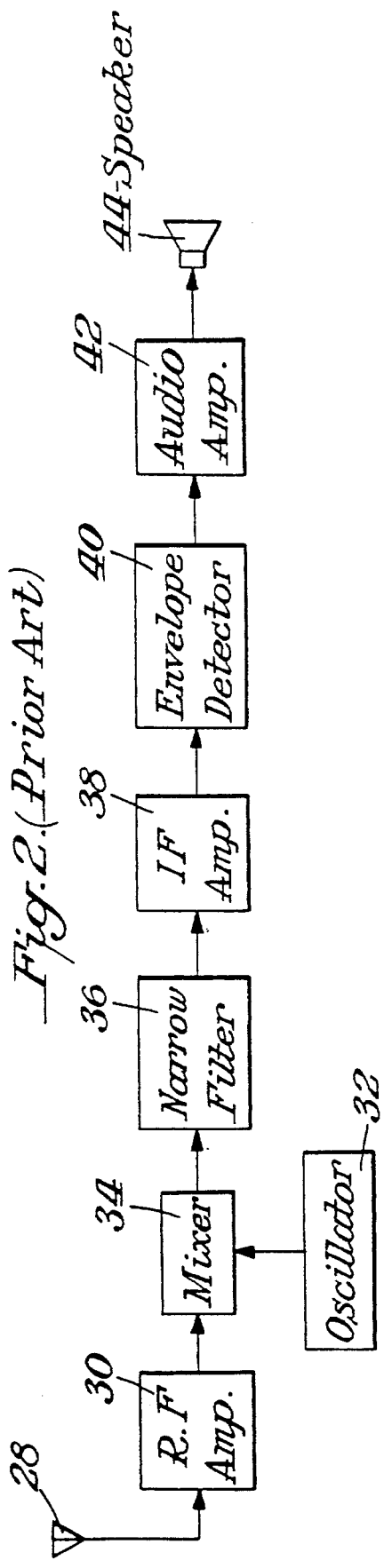
FIG. 2 is a step-block diagram of a conventional AM receiver.

FIG. 1 is a step block diagram of a standard AM transmitter, the oscillator 10 generates the standard sine waveform 12 (of FIG. 1A) of a given frequency, with voltage plotted on the vertical axis against time on the horizontal axis. A microphone 14 or other data input apparatus generates modulating signal 16, with the signal shown in FIG. 1b, with voltage fluctuation plotted against time. The two signals are mixed in a mixer 18 creating a traditional amplitude-modulated signal 20 having a true envelope 22. This signal is then amplified by amplifier 24, and transmitted through antenna 26.

This modulation is a direct result of the natural interference phenomenon, and the waveform envelope 22 is the result of the "beat" phenomenon.

FIG. 2 depicts a step block diagram of a standard AM receiver. The signal is received in antenna 28, and is sent to amplifier 30. The oscillator 32 generates a sinusoidal wave of variable frequency, which is mixed with the incoming amplified signal in mixer 34. The resulting frequency spectrum generated is filtered through narrow filter 36, and the resulting "selected" frequency (known as an "intermediate frequency") is amplified in IF (intermediate frequency) amplifier 38. The frequency is then passed through an envelope decoder 40, which is usually a rectifier circuit containing a capacitor.

The amplitude modulated signal is rectified by a diode so that only the upper waveforms are present. The capacitor acts to smooth out the waveform, transforming the AM signal into the modulating wave. This modulating wave is the transmitted data, which may be amplified by an audio amplifier 42 and played through speaker 44 or otherwise manipulated.

FIG. 3 is a step block diagram of a simple FM transmitter. Data is inputted at microphone or other apparatus 46, and the data is transformed into sinusoidal wave 48, as shown in FIG. 3b. An oscillator 50 generates a sinusoidal base carrier wave 52 at a selected rest frequency. The oscillator is controlled by a resonant circuit in the feedback path of the oscillator. As the modulating signal voltage rises and falls, the carrier frequency changes in proportion or inverse proportion to the voltage, resulting in a frequency-modulated signal 54 as shown in FIG. 3c. This signal, also known as indirect FM, is formed by pure electronic manipulation, relying not at all upon natural interference phenomena.

Figure 4:
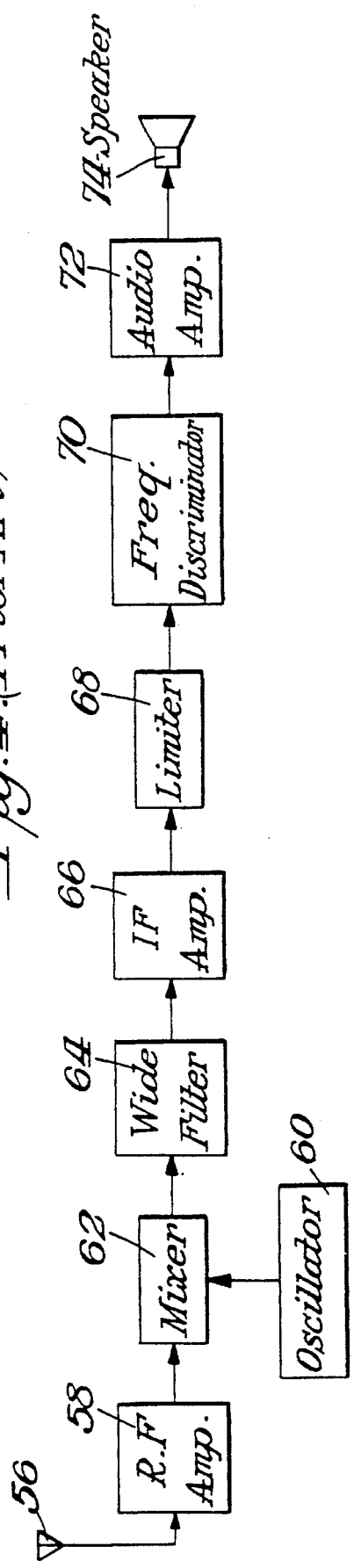
FIG. 4 is a step-block diagram of a conventional FM receiver.

FIG. 4 is a step-block diagram of a standard FM receiver. The frequency modulated signal 54 is received at antenna 56, and amplified at amplifier 58. Internal oscillator 60 generates a selected frequency which is mixed in mixer 62 to cause constructive or destructive interference and generate an intermediate frequency. This frequency is filtered through wide filter 64, and amplified in amplifier 66. Limiter 68 eliminates any amplitude fluctuations, and frequency discriminator 70 detects frequency shifts, converting these shifts in the FM signal into a low-frequency data or audio signal, which is amplified in amplifier 72 and may be played in speaker 74, if the data is an audio signal.

FIG. 5 shows a standard phase-modulated transmitter. Phase-modulated transmission is similar to FM transmission, with the exception that the modulation occurs after the oscillator stage. That is, the oscillator does not shift, but a reactance modulator 76 changes the capacitance or inductance of a resonant circuit in response to an input signal (audio or data) from microphone or other apparatus 78 which is amplified in amplifier 80. This alters the carrier frequency.

The frequency may then be multiplied by frequency multiplier 82(a–c), and amplified in amplifier 84 to be broadcast from antenna 86. The signal may be received on an FM receiver similar to that depicted in FIG. 4.

FIG. 6 is a partial step block diagram of a transmitter embodiment useful to generate the waveforms of the present invention. The first input signal is denoted by reference numeral 88. This data may be audio, or other electronic sinusoidal or digital input. The second input signal is denoted by reference numeral 90, and may also be any other form of data, including digital or binary coded information. This input signal may also be square or triangular (isosceles or right triangle) waves.

Armstrong modulator 92 processes the first input signal into a conventional FM signal. A higher rest frequency signal may also be used, including microwave and optical frequencies. Geometric modulator 94 (a symmetric geometric modulator) receives second input signal 90, and arranges the waveform by geometric modulation to obtain waveform 96, containing the two input data signals. The modulated waveform may be broadcast through antenna 98. The waveform may also be transmitted through data cables or fiber optic cables.

FIG. 7 is a step-block diagram of an embodiment of a receiver useful to receive waveforms generated according to the present invention. The geometrically modulated waveform is received at antenna 100, where it is transferred to a tank circuit 102 for amplification and splitting. The signal is sent in parallel to a high pass filter 104 and a low pass filter 106. After passing the low pass filter, the low-frequency geometrically modulating input signal 90, from FIG. 6 is detected at diode detector 108, and may be amplified or decoded in the audio circuitry 110. Other circuits may be used to manipulate this signal as well, not merely as an audio signal.

Diode detector 108 also concurrently sends a signal to the FM restore circuitry 112, which reverts the geometrically modulated FM signal to a standard FM signal 114 of unvarying amplitude envelope.

FIG. 8 is a electronic schematic of an example of a symmetric signaling power supply which may be used to geometrically modulate an FM signal. A frequency modulated wave (FM) is supplied to the base of transistor 174.

Audio message 176 is geometrically appended through splitter 178, resulting in geometrically modulated signal 180.

FIG. 9 is an electronic schematic of the FM restore circuitry in the geometrically modulated receiver of FIG. 7. Signal 182 from the diode detector 108 increases the gain on transistor which results in an increase in the amplitude of geometrically modulated input wave 186, yielding a standard FM signal.

Figure 10:
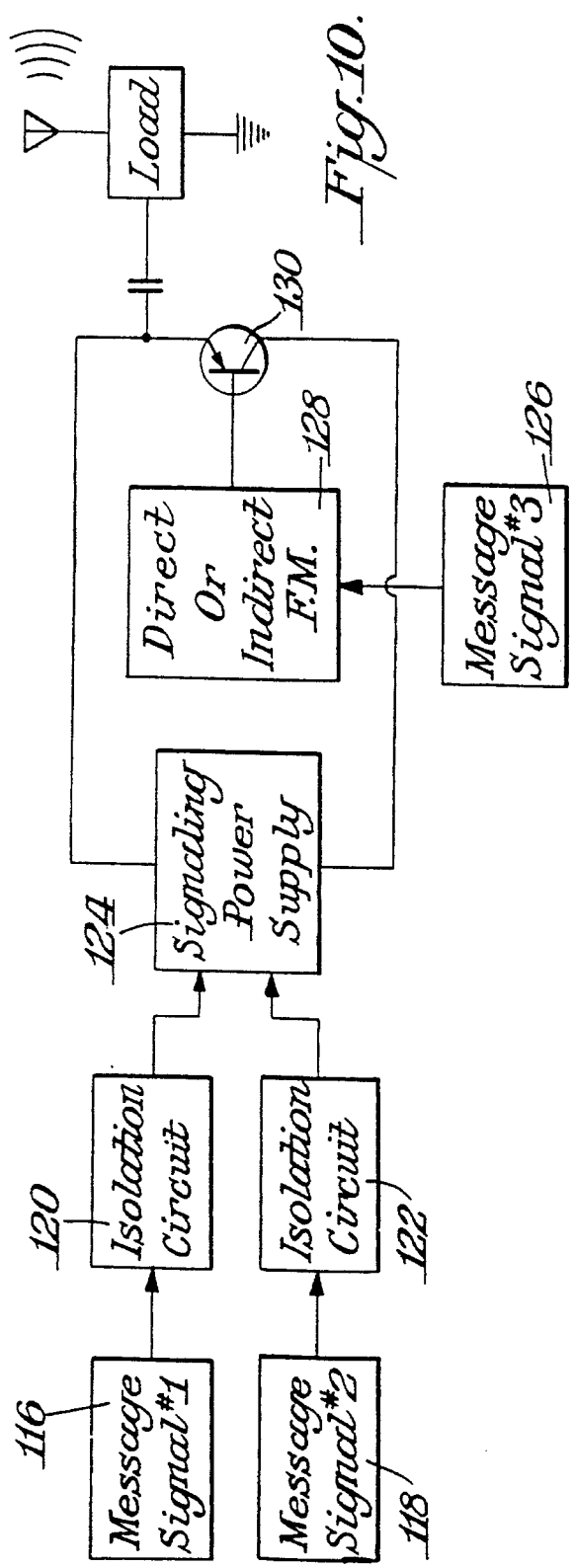
FIG. 10 is a step-block diagram of a preferred embodiment of the present invention.

A particularly preferred embodiment which may utilize two waveforms according to the present invention simultaneously, wherein the informational content of a transmitted signal is increased by a factor of three is shown in FIG. 10. Message signal 1, reference numeral 116, is a data, audio or other signal which is desired to be transmitted. Message signal 2, reference numeral 118 is also a data, audio, or other signal which is desired to be transmitted. After passing through respective isolation circuits 120 and 122, these message signals direct the signaling power supply 124 (asymmetric), which emits a controlling signal. In the interim, a third message signal 126 is encoded into a direct or indirect FM signal 128. The signals are mixed in bipolar transistor 130 to generate a signal with a geometrically altered waveform.

FIG. 11 is a graphical representation of a waveform produced by a geometric modulation apparatus without the unique encoding of the present invention. Message signal 1 results in an upper waveform encoded as a rectilinear envelope 132. Message signal 2 results in a lower waveform encoded as a sinusoidal waveform 134. Message signal 3 is the standard FM signal 136.

One feature of the present invention is its ability to change the voltage gain of the FM signal without effecting the harmonic content of the wave. This artificially sculpted geometry, not relying upon wave interference characteristics, enables an additional message signal to be placed in the upper and lower signal envelopes, without the necessary addition of excessively expensive and costly circuitry.

Figure 13:
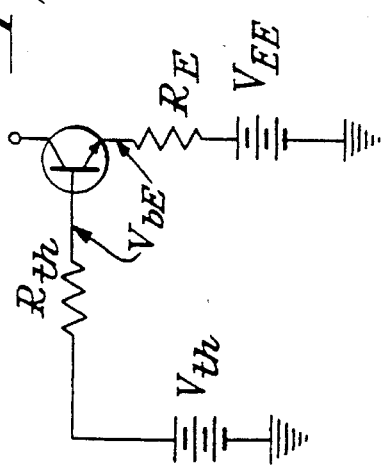
FIG. 13 is an electronic schematic of a Thevenin equivalent circuit.
Figure 12:
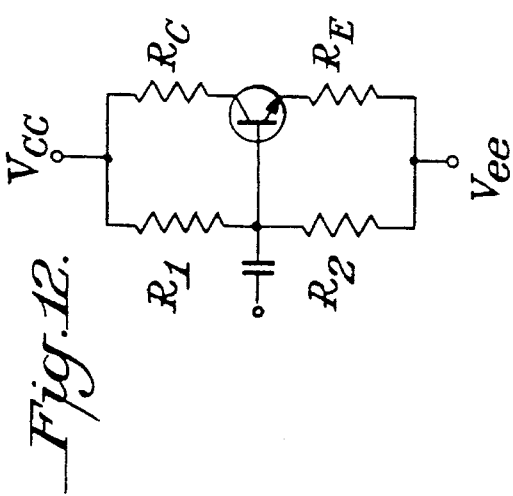
FIG. 12 is an electronic schematic of a transistor amplifier array.

FIG. 12 is a transistor amplifier array, and FIG. 13 is its Thevenian equivalent circuit. Frequency modulation occurs when the change in frequency of the carrier wave is proportional to the modulating wave amplitude. The relationship is governed by the equation $$V = V_c \sin(\omega_{cf} + M_F \sin \omega_M t)$$

where $$\text{the modulation index } M_p = \frac{\text{Maximum carrier frequency}}{\text{modulating frequencies}}.$$

By utilizing simple geometric relationships and Kirkoff's laws, it may be seen that if $V_{ee}$ and $V_{cc}$ are functions of time, then the "β" appears to fluctuate with time in accordance with the waveforms. Thus, the signaling power supply varies at an information rate, and therefore the resulting change in gain of the transistor changes the output waveform to coincide with the envelopes. The envelopes contain the message (sinusoidal wave) or data (square wave) signal.

This may be seen by reference to the following geometric proof. As noted above, this proof is offered only by wy of explanation, and not by limitation. The applicants are not bound by this or any other theory.

The array of FIG. 13 is solved as follows:

$$V_{th} = \frac{V_{cc}R_2}{R_1+R_2} + V_{ee}$$

solving for $R_{th}$, $$R_{th} = \frac{R_1R_2}{R_1+R_2}$$

utilizing Kirkoff's laws, $$V_{th} - I_bR_{th} - V_{be} - (\beta+1)I_bR_E - V_e\epsilon = 0$$

$$\frac{V_{cc}R_2}{R_1+R_2} - \frac{I_bR_1R_2}{R_1+R_2} - V_{be} - (\beta+1)I_bR_E - V_{ee} = 0$$

$$\beta + 1 = \frac{V_{ee}}{I_bR_E} - \left(\frac{R_2}{R_1+R_2}\right)\frac{V_{cc}}{I_bR_\epsilon} +$$

$$\frac{R_1R_2}{(R_1+R_2)R_E} + \frac{V_{be}}{I_bR_E}$$

$$\beta(t) = \frac{V_{ee(t)}}{I_{b(t)}R_E} - \left(\frac{R_2}{R_1+R_2}\right) \cdot \frac{V_{cc(t)}}{I_{b(t)}R_\epsilon} +$$

$$\frac{R_1R_2}{(R_1+R_2)R_E} + \frac{V_{be(t)}}{I_{b(t)}R_E} - 1$$

In other words, if $V_{ee}$ and $V_{cc}$ are functions of time, then the "β" appears to fluctuate with time in accordance with the waveforms.

FIG. 14 is an electronic schematic of a transmitter device useful to generate waveforms according to the present invention with an asymmetric power supply. A base, or "primary" FM carrier signal 138 of a selected rest frequency is provided. This signal is FM modulated (direct or indirect) by a first input signal 138. Additional input signals 144(a) and 144(b) are provided for the upper and lower waveforms. In this particular embodiment, voice input 140 (first additional input) controls the signaling power supply for the upper waveform, appending voice input signal 140 in the upper quadrant (positive) of the FM carrier. Data input 142 (second additional input) is appended in the lower quadrant (negative) of the FM carrier, forming the lower waveform. This circuit generates a complete geometrically modulated waveform 144 with an upper sinusoidal waveform 144a (voice) and a lower square waveform 144(b) (data).

Figure 15:
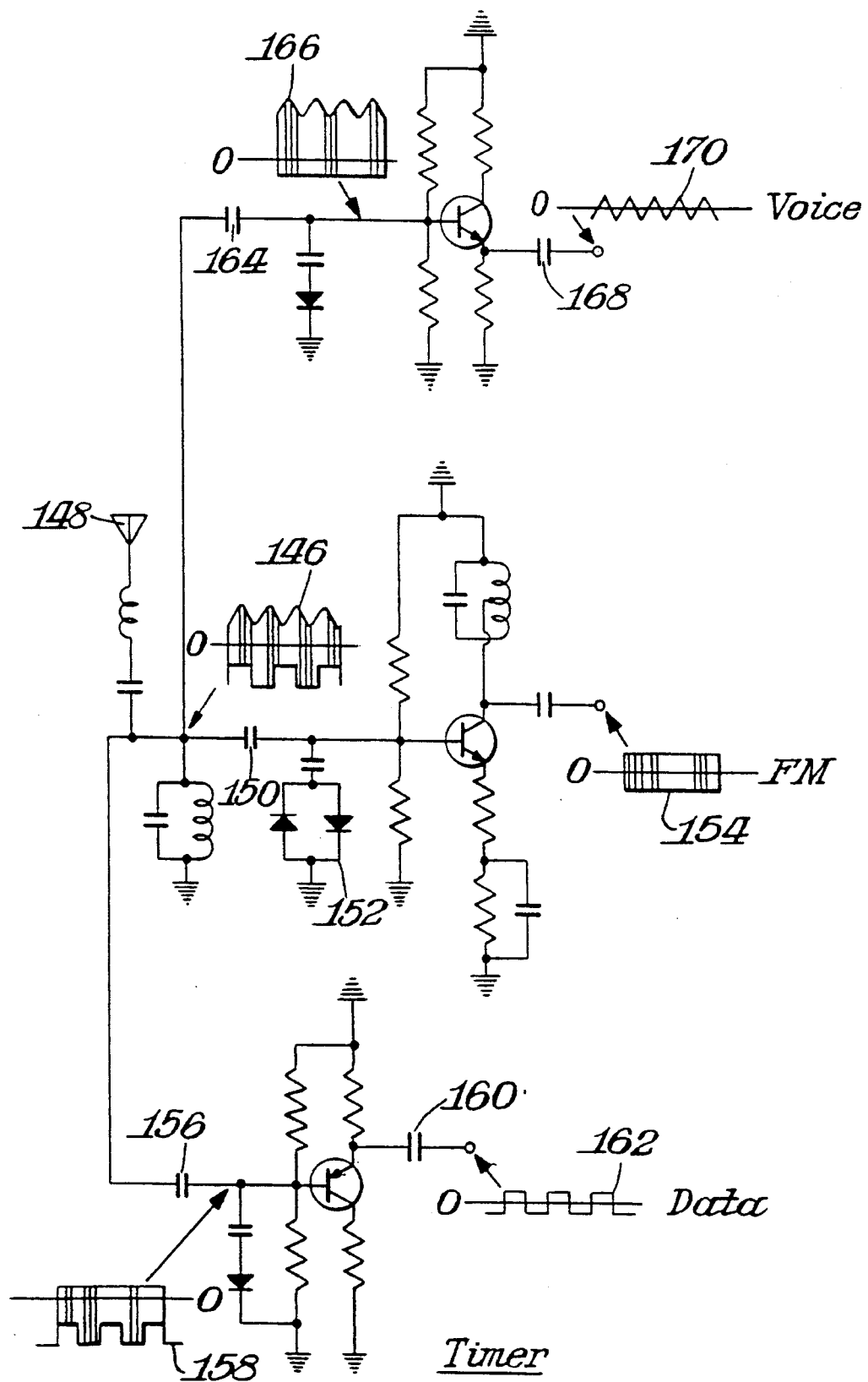
FIG. 15 is an electronic schematic of a preferred embodiment of a receiver ("tuner") according to the present invention.

FIG. 15 is an electronic schematic of a receiver, or "tuner" device. Incoming geometrically modulated electromagnetic signal waveform 146 is received at antenna 148.

High pass filter 150 removes the upper and lower waveforms, in conjunction with limiter 152, a regulated signal of a certain peak-to-peak voltage is provided (a standard FM signal). This provides restored FM signal 154.

High pass filter 156 provides waveform 158, which contains the lower waveform portion. It is passed through capacitor 160 to yield data signal 162.

High pass filter 164 yields waveform 166, which contains the upper waveform envelope. When waveform 166 is passed through capacitor 168, voice signal 170, a sinusoidal waveform is recovered.

FIG. 16 is a step block diagram illustrating how an EPROM generates a wave. Input 172 (which again may be voice, data, or other input) is fed into oscillator 174 is a square wave generator which acts as the system clock which produces a binary coded decimal output.

Binary counter 176 generates a binary signal which is fed to an appropriate address at the EPROM. The EPROM generates an output corresponding to the number contained at that address. Finally, the digital to analog converter 180 converts that number into a voltage value which can control a signaling power supply and generate the appropriate wave.

FIG. 17 illustrates a hardware version which performs the function of the previously described EPROM device of FIG. 16. Input from sweep oscillator 182 activates the base of at least one transistor acting as a switch 184, putting it into conduction mode. The voltage point between two series resistances in the emitter or collector of the transistor 184 produces a voltage. This voltage is transferred through at least one isolation amplifier over resistors 186, 188 into a summing amplifier 190. The voltages from the summing amplifier represent the voltage of the output wave at various time intervals. This avoids the need for accessing time in the EPROM and speeds up the overall frequency.

This generated wave is modulated by attenuating or expanding the sweep or amplitude with a data signal, and then is useful as a communications carrier or transmission.

The output may takes the shape of a wave as illustrated in FIG. 17A (aligned for the sweep of the oscillator versus output), or 18, depending upon the desired waveform.

The unique waveforms described in the instant invention bear some additional description here. The waves discovered utilizable for modulating transmissions are obtained by partitioning an infinite series expansion of the generated elements of a cyclic group as discussed above and further demonstrated below:

$$e^x = 1 + x + \frac{x^2}{2!} + \frac{x^3}{3!} + \frac{x^4}{4!} + \frac{x^5}{5!} + \ldots +$$

$$\sum_{N=0}^{\infty} \frac{x^n}{N!}$$

where $X = \delta\Theta$ $$e^{\delta\theta} = 1 + \delta\theta + \frac{\delta^2\theta^2}{2!} + \frac{\delta^3\theta^3}{3!} + \frac{\delta^4\theta^4}{4!} + \frac{\delta^5\theta^5}{5!} + \ldots$$

$$e^{\delta\theta} = 1 + \delta\theta + i\frac{\theta^2}{2!} + i\delta\frac{\theta^3}{3!} + \frac{\theta^4}{4!} +$$

$$\delta\frac{\theta^5}{5!} + i\frac{\theta^6}{6!} + i\delta\frac{\theta^7}{7!} + \ldots$$

for $\delta = i^{3/2}$ $$e^{\delta\theta} = R(\theta) - iI(\theta) - i^{1/2}C(\theta) + i^{3/2}S(\theta)$$

$$C(\theta) = \frac{\theta^3}{3!} - \frac{\theta^7}{7!} + \frac{\theta^{11}}{11!} - \frac{\theta^{15}}{15!} + \frac{\theta^{19}}{19!} -$$

$$\frac{\theta^{23}}{23!} + \frac{\theta^{27}}{27!} \rightarrow \sum_T (-1)^T \frac{\theta^{4T+3}}{(4T+3)!}$$

Figure 19:
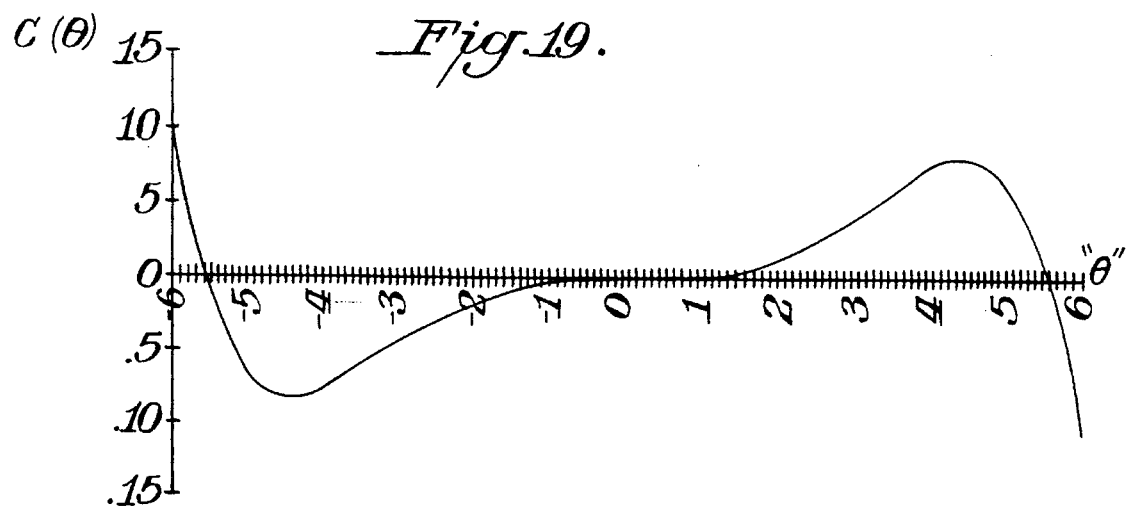
FIG. 19 is a representation of a wave produced according to the instant invention which has one orthogonal axis crossing which is oblique (a prolonged inflection point at zero).

The above represents the wave of FIG. 19.

$$S(\theta) = \frac{\theta}{1!} = \frac{\theta^5}{5!} + \frac{\theta^9}{9!} - \frac{\theta^{13}}{13!} + \frac{\theta^{17}}{17!} - \frac{\theta^{21}}{21!} +$$

$$\frac{\theta^{25}}{25!} \rightarrow \sum_T (-1)^T \frac{\theta^{4T+1}}{(4T+1)!}$$

Figure 21:
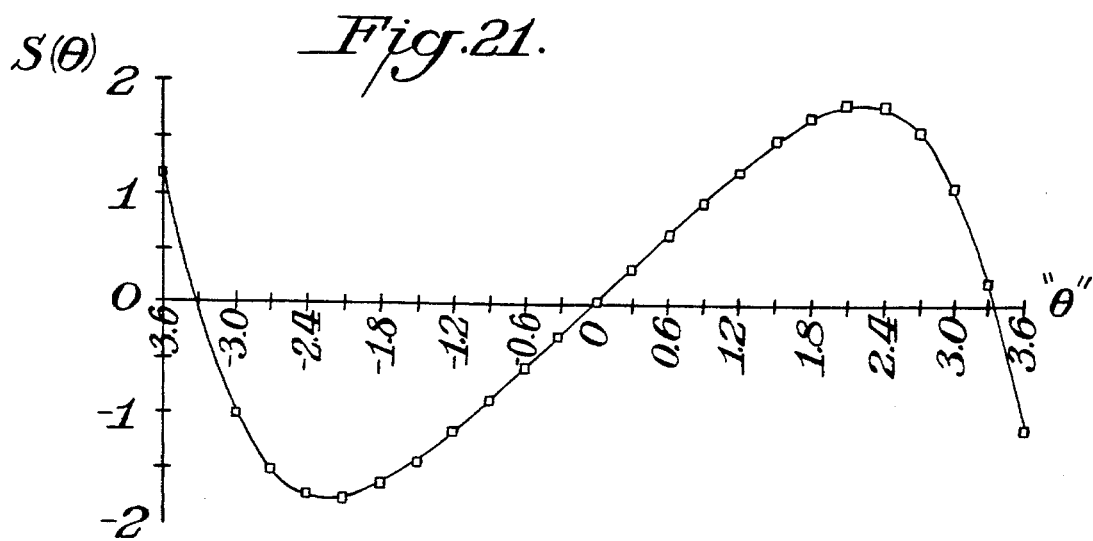
FIG. 21 is a representation of a sawtooth variant wave produced according to the instant invention.
Figure 23:
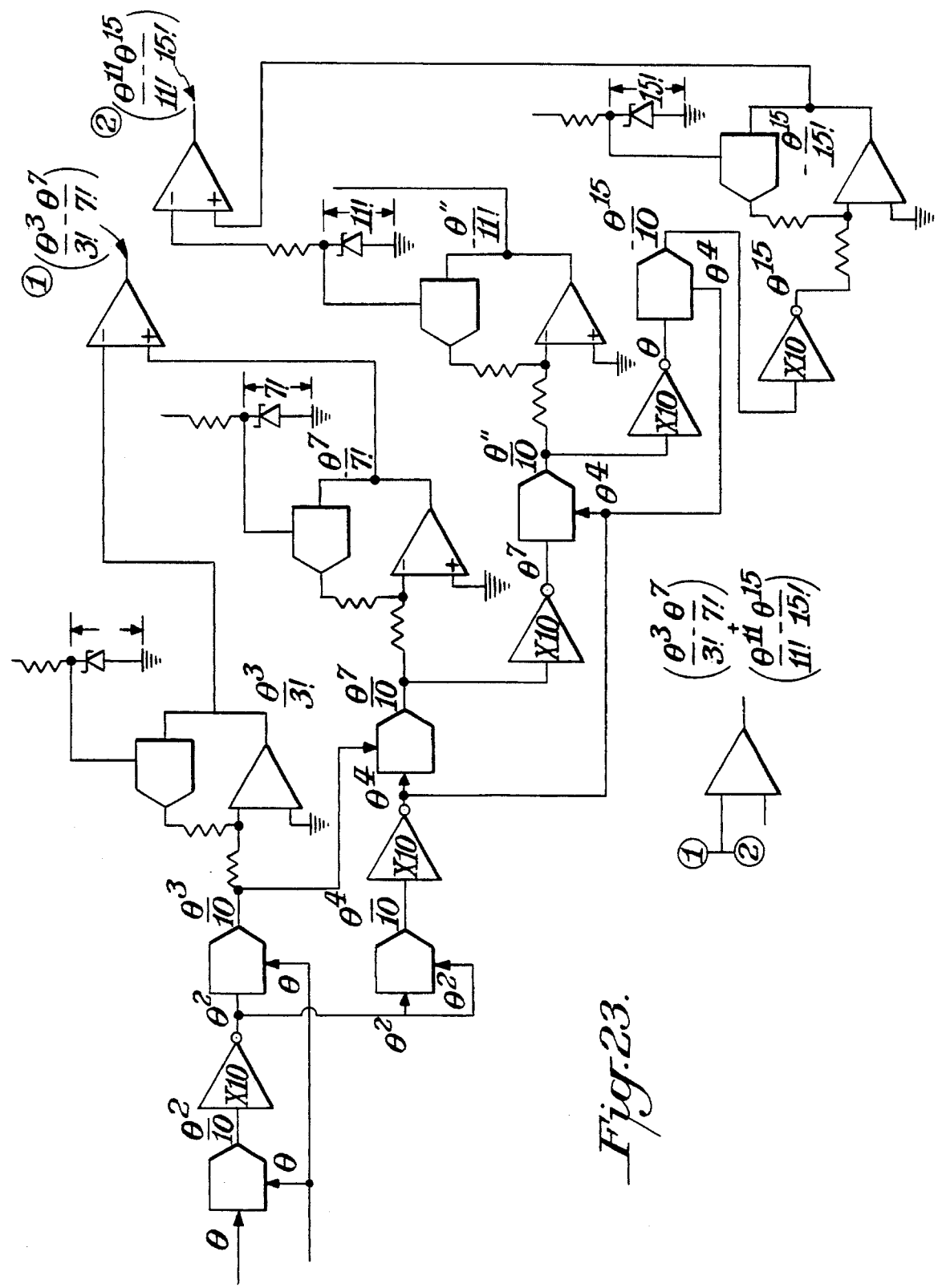
FIG. 23 is an electronic schematic of a specific equation circuit which provides the waves of the instant invention.

The above represents the wave of FIG. 21

$$I(\theta) = \frac{\theta^2}{2!} - \frac{\theta^6}{6!} + \frac{\theta^{10}}{10!} - \frac{\theta^{14}}{14!} + \frac{\theta^{18}}{18!} -$$

$$\frac{\theta^{22}}{22!} + \frac{\theta^{26}}{26!} \rightarrow \sum_T (-1)^T \frac{\theta^{4T+2}}{(4T+2)!}$$

Figure 20:
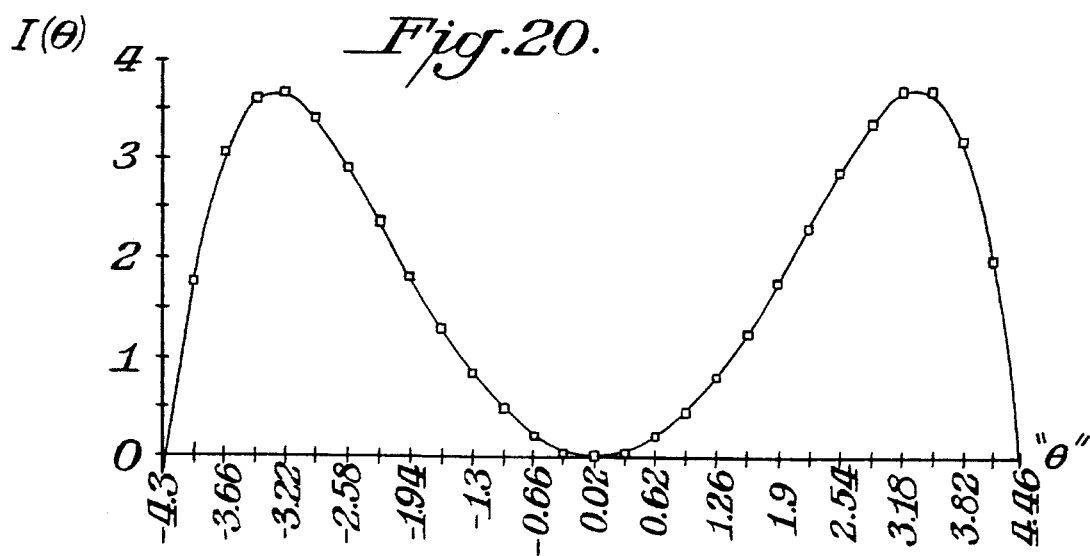
FIG. 20 is a representation of an asymmetric wave having two skewed maximi.

The above represents the wave of FIG. 20, and $$R(\theta) = 1 - \frac{\theta^4}{4!} + \frac{\theta^8}{8!} - \frac{\theta^{12}}{12!} + \frac{\theta^{16}}{16!} - \frac{\theta^{20}}{20!} +$$

$$\frac{\theta^{24}}{24!} \to \sum_T (-1)^T \frac{\theta^{4T}}{(4T)!}$$

Figure 18:
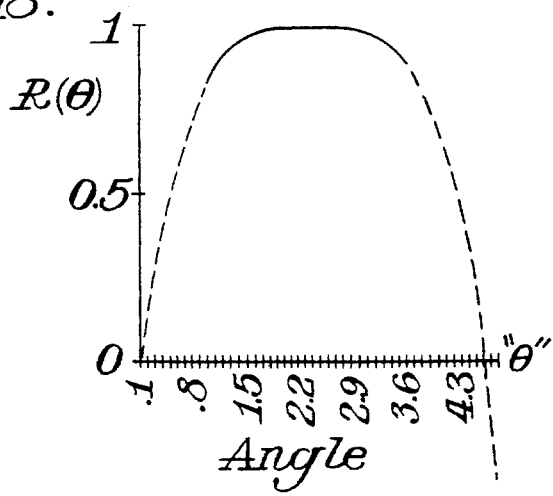
FIG. 18 is a representation of a wave produced according to the instant invention with a overall trapezoidal shape.

The above represents the wave of FIG. 18.

The four above defined waves are interrelated as follows:

$$\frac{dR(\theta)}{d\theta} = -C(\theta) \to \frac{dC(\theta)}{d\theta} = I(\theta) \to \frac{dI(\theta)}{d\theta} =$$

$$S(\theta) \to \frac{dS(\theta)}{d\theta} = R(\theta)$$

$$1 = R(\theta)^2 - I^2(\theta) - 2S(\theta)C(\theta)$$

and finally, $$1 = R(\theta)^2 - I^2(\theta) - 2C(\theta)S(\theta)$$
$$0 = C^2(\theta) - S^2(\theta) + 2R(\theta)I(\theta)$$

To summarize:

$$R(-\theta) = R(\theta), I(-\theta) = I(\theta), S(-\theta) = -S(\theta), c(-\theta) = -C(\theta)$$

$$\frac{dR(\theta)}{d\theta} = -C(\theta), \frac{dI(\theta)}{d\theta} = S(\theta), \frac{dS(\theta)}{d\theta} = R(\theta), \frac{dC(\theta)}{d\theta} = I(\theta)$$

$$\theta = 2\pi K, K = 1,2,3,4,5,6,7,8,9, \ldots$$

$$\cos\theta = R^2(\phi) - I^2(\phi) - 2S(\phi)C(\phi), \sin\theta =$$

$$S^2(\phi) - C^2(\phi) - 2R(\phi)I(\phi)$$

$$R(\theta + \phi) = R(\theta)R(\phi) - I(\theta)I(\phi) - S(\theta)C(\phi)$$

$$I(\theta + \phi) = I(\theta)R(\phi) + I(\phi)R(\theta) - C(\theta)C(\phi) +$$

$$S(\theta)S(\phi) - I(\theta)S(\phi) - S(\phi)C(\theta) - S(\theta)$$

$$C(\theta + \phi) = C(\phi)R(\theta) + C(\theta)R(\phi)$$
$$S(\theta + \phi) = I(\phi)C(\theta) + 2R(\theta)S(\phi) + S(\theta)R(\phi)$$
$$e^{i^{3/2}\theta} = R(\theta) - iI(\theta) - i^{1/2}C(\theta) + i^{3/2}S(\theta)$$

The waves are then defined by the truncated formulae:

$$C(\theta) = \frac{\theta^3}{3!} - \frac{\theta^7}{7!} + \frac{\theta^{11}}{11!} - \frac{\theta^{15}}{15!} + \frac{\theta^{19}}{19!} -$$

$$\frac{\theta^{23}}{23!} + \frac{\theta^{27}}{27!} \sum_{T=0} (-1)^T \frac{\theta^{4T+3}}{(4T+3)!}$$

$$S(\theta) = \frac{\theta}{1!} - \frac{\theta^5}{5!} + \frac{\theta^9}{9!} - \frac{\theta^{13}}{13!} + \frac{\theta^{17}}{17!} -$$

$$\frac{\theta^{21}}{21!} + \frac{\theta^{25}}{25!} \sum_{T=0} (-1)^T \frac{\theta^{4T+1}}{(4T+1)!}$$

$$I(\theta) = \frac{\theta^2}{2!} - \frac{\theta^6}{6!} + \frac{\theta^{10}}{10!} - \frac{\theta^{14}}{14!} + \frac{\theta^{18}}{18!} -$$

$$\frac{\theta^{22}}{22!} + \frac{\theta^{26}}{26!} \sum_{T=0} (-1)^T \frac{\theta^{4T+2}}{(4T+2)!}$$

$$R(\theta) = 1 - \frac{\theta^4}{4!} + \frac{\theta^8}{8!} - \frac{\theta^{12}}{12!} + \frac{\theta^{16}}{16!} -$$

$$\frac{\theta^{20}}{20!} + \frac{\theta^{24}}{24!} \sum_{T=0} (-1)^T \frac{\theta^{4T}}{(4T)!}$$

These new waves for communications are a progressive step forward from the former square waves. The new waves can be expressed as a closed form algebraic equation and avoids the problems associated with harmonically synthesizing waves.

For example, an amplifier will harmonically distort an output wave from its input square wave, i.e. the resulting wave is missing some of the harmonics that were initially present in the original wave.

Standard prior art waves are produced by manipulation of harmonics. For example, if one wants to synthesize a square wave, one generates a sine or cosine wave by increasing its amplitude and then truncating the upper waveform with a diode. This induces noise, distortion, and a polyglot of harmonics.

A push-pull amplifier, used in audio, is a classic example of how a signal output must be cleansed. Such an amp filters out odd order harmonics because they contribute to distortion.

Waves according to the instant invention do not suffer from this drawback. They have no harmonics—i.e. no multiples of some fundamental. The apparatus according to the present invention functions essentially as follows. Further, depending on the value selected for n, in the relationship $$P_n = e^{i(\frac{2^n-1}{2^{n-1}})}$$

the wave utilized can be a virtually secure communications channel. If a priority signal is desired, a large number of channels could be used to overcome the noise of other channels in the same communications "circuit", which can be RF transmissions, fiberoptic, or wire transmission.

Creation of A Unique Information Encoded Carrier Wave

One of the unique waveforms described above, i.e. a wave generated by a function generator programmed with one of the following formulae, derivatives thereof, or integrals thereof.

$$C(\theta) = \frac{\theta^3}{3!} - \frac{\theta^7}{7!} + \frac{\theta^{11}}{11!} - \frac{\theta^{15}}{15!} + \frac{\theta^{19}}{19!} -$$

$$\frac{\theta^{23}}{23!} + \frac{\theta^{27}}{27!} \sum_{T=0} (-1)^T \frac{\theta^{4T+3}}{(4T+3)!}$$

$$S(\theta) = \frac{\theta}{1!} - \frac{\theta^5}{5!} + \frac{\theta^9}{9!} - \frac{\theta^{13}}{13!} + \frac{\theta^{17}}{17!} -$$

$$\frac{\theta^{21}}{21!} + \frac{\theta^{25}}{25!} \sum_{T=0} (-1)^T \frac{\theta^{4T+1}}{(4T+1)!}$$

$$I(\theta) = \frac{\theta^2}{2!} - \frac{\theta^6}{6!} + \frac{\theta^{10}}{10!} - \frac{\theta^{14}}{14!} + \frac{\theta^{18}}{18!} -$$

$$\frac{\theta^{22}}{22!} + \frac{\theta^{26}}{26!} \sum_{T=0} (-1)^T \frac{\theta^{4T+2}}{(4T+2)!}$$

$$R(\theta) = 1 - \frac{\theta^4}{4!} + \frac{\theta^8}{8!} - \frac{\theta^{12}}{12!} + \frac{\theta^{16}}{16!} -$$

$$\frac{\theta^{20}}{20!} + \frac{\theta^{24}}{24!} \sum_{T=0} (-1)^T \frac{\theta^{4T}}{(4T)!}$$

This generated wave is uniform, as represented by repetitions of the waves of FIGS. 18–21.

A data input, either analog, digital, voice, or data, is combined with this wave in a combiner circuit to generate a wave which contains information encoded thereon. The combiner circuit can utilize either geometric modulation as described below or simple addition circuitry.

Alternatively, the novel waveforms can act as the modulation for the underlying carrier.

Geometric Modulation With the Wave

The information containing wave as described above in its unique waveform is encoded onto a wave which has already been modulated once by frequency modulation.

To accomplish this, a primary carrier wave (frequency modulated with a first data signal) is fed through a variable power supply, either symmetric or asymmetric.

The information containing wave is then geometrically modulated onto the primary carrier wave by adjusting the voltage of the primary carrier wave to conform to the information containing wave. The asymmetric power supply allows for the addition of two signals, each of which may be different.

Figure 22:
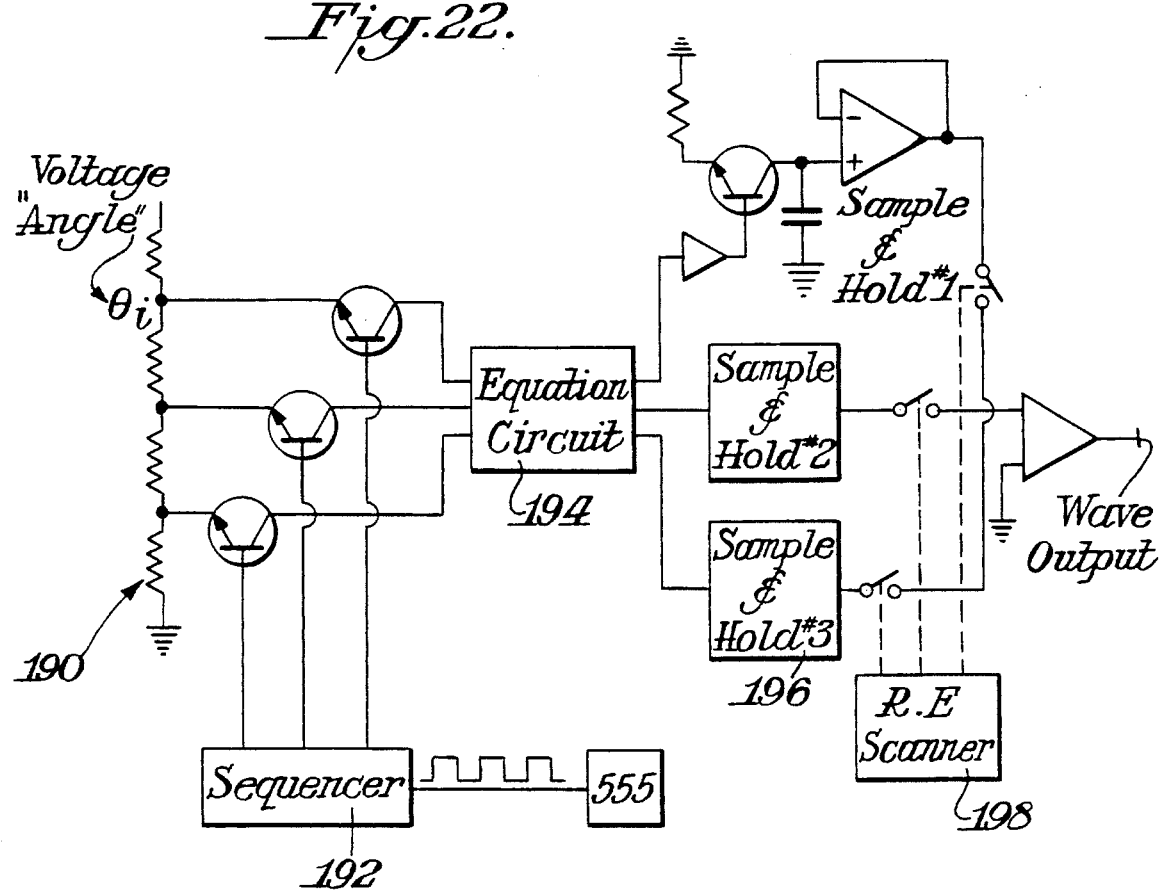
FIG. 22 is an electronic schematic of an apparatus which generates the waves of the instant invention.

In practice, this may be carried out as follows. As may be seen in FIG. 22, a resistor string 190 generates a series of voltages which are equal in magnitude to an angle expressed in radians. This voltage representation of an angle is transferred through an angle select switch "Sequencer" 192 to an equation circuit 194.

The equation circuit is an electrical functional representation of one of the four illustrative equations which generate the waves of the present series. It contains analog multipliers and operational amplifiers, and is a unique circuit. The circuit transforms the voltage (representing the angle) into a voltage representing the function $$S(\theta) = \left( \frac{\theta^3}{3!} - \frac{\theta^7}{7!} \right) + \left( \frac{\theta^{11}}{11!} - \frac{\theta^{15}}{15!} \right)$$

which has a truncation error of less than or equal to $\theta^{19}/19!$. Extra circuitry may be added by those of skill in the art, having regard for this disclosure, which would even lessen that truncation error, but as a practical matter it is unnecessary.

The functional voltage is stored in a sample and hold circuit 196. After all the desired voltages generated on the resistor string have been transformed by input to the equation circuit and stored in the sample and holds, the sample and hold circuits are then scanned at a radio frequency rate by a scanner 198 to generate a carrier wave.

An information signal may then be added on by a combiner circuit or by the geometric modulation discussed above.

The novel communications protocol involving the unique encoding waves is useful for direct RF transmission. A transmitter equipped with the equation circuit or programmed eprom can be directly outputted as a radio frequency transmission through an antenna. The waves are also suitable for transmission as electrical impulses down a standard wire, crystal, or as light impulses down a fiberoptic cable. Such conduits are useful for the waves and can convey information expediently.

One major advantage of the novel modulation method and apparatus of the present invention is that data in the form of square waves may be transmitted over a conventional transmission system. Due to the variance of the speed of light in various media, the waveform of a square wave, especially useful in digital data, normally cannot be encoded and transmitted over cables. A square wave requires instantaneous voltage changes, which cannot be transmitted with sufficient speed through copper or other media to maintain the sharp waveforms required for clear data transmission.

The lag time present in the material softens the square waves, making them almost trapezoidal in shape. The novel waveforms suffer from no such degradation.

The novel communications protocol is ideally situated for the transmission of signals which are geometrically modulated by the new waves generated by an apparatus according to the present invention.

I claim:

1. A process for the production of a wave comprising the step of:

selecting a base waveform from the group of waves defined by the formulas:

$$C(\theta) = -\frac{\theta^3}{3!} - \frac{\theta^7}{7!} + \frac{\theta^{11}}{11!} - \frac{\theta^{15}}{15!} + \frac{\theta^{19}}{19!} - \frac{\theta^{23}}{23!} +$$

$$\frac{\theta^{27}}{27!} \sum_{T=0} (-1)^T \frac{\theta^{4T+3}}{(4T+3)!}$$

$$S(\theta) = \frac{\theta}{1!} - \frac{\theta^5}{5!} + \frac{\theta^9}{9!} - \frac{\theta^{13}}{13!} + \frac{\theta^{17}}{17!} - \frac{\theta^{21}}{21!} +$$

$$\frac{\theta^{25}}{25!} \sum_{T=0} (-1)^T \frac{\theta^{4T+1}}{(4T+1)!}$$

$$I(\theta) = \frac{\theta^2}{2!} - \frac{\theta^6}{6!} + \frac{\theta^{10}}{10!} - \frac{\theta^{14}}{14!} + \frac{\theta^{18}}{18!} - \frac{\theta^{22}}{22!} +$$

$$\frac{\theta^{26}}{26!} \sum_{T=0} (-1)^T \frac{\theta^{4T+2}}{(4T+2)!}$$

$$R(\theta) = 1 - \frac{\theta^4}{4!} + \frac{\theta^8}{8!} - \frac{\theta^{12}}{12!} + \frac{\theta^{16}}{16!} - \frac{\theta^{20}}{20!} +$$

$$\frac{\theta^{24}}{24!} \sum_{T=0} (-1)^T \frac{\theta^{4T}}{(4T)!}$$

wherein

Θ is the angle in radians of the wave,

T is an integer from 1 to ∞ representing the truncation point of the function, and C(Θ), S(Θ), I(Θ) and R(Θ) the amplitude of the wave.

2. A process as claimed in claim 1, wherein the wave is synthesized by an equation circuit.

3. A process as claimed in claim 2, wherein the equation circuit comprises a sweep oscillator which conductively activates a plurality of transistors in a preselected order, a series resistance which generates a voltage from said activated transistor, an isolation amplifier which isolates the generated voltage, and a summing amplifier which accepts each isolated voltage and produces a final amplitude of the wave.

4. A process as claimed in claim 1, wherein the wave is synthesized by analog or digital devices.

5. A process as claimed in claim 1, wherein the wave is generated by a programmable chip or computer.

6. A process as claimed in claim 5, wherein the programmable chip comprises an oscillator which activates a binary counter, said binary counter then providing timed inputs to a programmed eprom chip, and said eprom chip containing the waveform in memory and generating the wave in digital form from the input from the binary counter.

7. A process as claimed in claim 6, wherein the programmable chip or computer further includes a subsequent digital to analog converter for generating an analog representation of the wave.

8. A process as claimed in claim 6, wherein the output from the eprom is sequentially inputted into sample and hold circuits, which are scanned at a selected wave frequency.

9. A process for the transmission of information containing waves, comprising the steps of:

producing a first wave according to a first formula selected from the group consisting of $$C(\theta) = \frac{\theta^3}{3!} - \frac{\theta^7}{7!} + \frac{\theta^{11}}{11!} = \frac{\theta^{15}}{15!} + \frac{\theta^{19}}{19!} -$$

$$\frac{\theta^{23}}{23!} + \frac{\theta^{27}}{27!} \sum_{T=0} (-1)^T \frac{\theta^{4T+3}}{(4T+3)!}$$

$$S(\theta) = \frac{\theta}{1!} - \frac{\theta^5}{5!} + \frac{\theta^9}{9!} - \frac{\theta^{13}}{13!} + \frac{\theta^{17}}{17!} -$$

$$\frac{\theta^{21}}{21!} + \frac{\theta^{25}}{25!} \sum_{T=0} (-1)^T \frac{\theta^{4T+1}}{(4T+1)!}$$

$$I(\theta) = \frac{\theta^2}{2!} - \frac{\theta^6}{6!} + \frac{\theta^{10}}{10!} - \frac{\theta^{14}}{14!} + \frac{\theta^{18}}{18!} -$$

-continued
$$R(\theta) = 1 - \frac{\theta^4}{4!} + \frac{\theta^8}{8!} - \frac{\theta^{12}}{12!} + \frac{\theta^{16}}{16!} - \frac{\theta^{20}}{20!} + \frac{\theta^{22}}{22!} + \frac{\theta^{26}}{26!} \sum_{T=0} (-1)^T \frac{\theta^{4T+2}}{(4T+2)!}$$
$$- \frac{\theta^{20}}{20!} + \frac{\theta^{24}}{24!} \sum_{T=0} (-1)^T \frac{\theta^{4T}}{(4T)!}$$

wherein $\Theta$ is the angle in radians of the wave,

T is an integer from 1 to $\infty$ representing the truncation point of the function, and $C(\Theta)$, $S(\Theta)$, $I(\Theta)$ and $R(\Theta)$ represent the amplitude of the wave encoding an information signal upon the produced wave to form an information containing wave, transmitting the information containing wave through a medium, generating a second wave from the first formula, and decoding the transmitted wave by demodulating the transmitted wave with the second wave.

10. A process as claimed in claim 9, wherein the medium is a fiber optic system.

11. A process as claimed in claim 9, wherein the medium is electromagnetic radiation in the form of microwaves or radio frequency waves.

12. A process for the production of an electromagnetic wave comprising the steps of:

providing a primary carrier wave having a first selected rest frequency, which carrier wave is modulated by varying its frequency according to a first input signal having a frequency less than the rest frequency of the primary carrier wave, providing at least one additional input signal, said at least one additional input signal having a frequency lower than the rest frequency of the primary carrier wave;

generating a second wave according a formula selected from the group consisting of $$C(\theta) = \frac{\theta^3}{3!} - \frac{\theta^7}{7!} + \frac{\theta^{11}}{11!} = \frac{\theta^{15}}{15!} + \frac{\theta^{19}}{19!} - \frac{\theta^{23}}{23!} + \frac{\theta^{27}}{27!} \sum_{T=0} (-1)^T \frac{\theta^{4T+3}}{(4T+3)!}$$

$$S(\theta) = \frac{\theta}{1!} - \frac{\theta^5}{5!} + \frac{\theta^9}{9!} - \frac{\theta^{13}}{13!} + \frac{\theta^{17}}{17!} - \frac{\theta^{21}}{21!} + \frac{\theta^{25}}{25!} \sum_{T=0} (-1)^T \frac{\theta^{4T+1}}{(4T+1)!}$$

$$I(\theta) = \frac{\theta^2}{2!} - \frac{\theta^6}{6!} + \frac{\theta^{10}}{10!} - \frac{\theta^{14}}{14!} + \frac{\theta^{18}}{18!} - \frac{\theta^{22}}{22!} + \frac{\theta^{26}}{26!} \sum_{T=0} (-1)^t \frac{\theta^{4T+2}}{(4T+2)!}$$

$$R(\theta) = 1 - \frac{\theta^4}{4!} + \frac{\theta^8}{8!} - \frac{\theta^{12}}{12!} + \frac{\theta^{16}}{16!} - \frac{\theta^{20}}{20!} + \frac{\theta^{24}}{24!} \sum_{T=0} (-1)^T \frac{\theta^{4T}}{(4T)!}$$

wherein $\Theta$ is the angle in radians of the wave,

T is an integer from 1 to $\infty$ representing the truncation point of the function, and $C(\Theta)$, $S(\Theta)$, $I(\Theta)$ and $R(\Theta)$ represent the amplitude of the wave to provide a series of amplitudes as a reference sequence to form a second wave, combining the additional input signal with the second wave to form an information carrying wave, and varying the gain of the primary carrier wave with a power supply that varies at the rate of the information carrying wave, whereby the external waveform of the primary carrier wave is varied at an information rate to form the electromagnetic wave.

13. A process as claimed in claim 12, wherein the additional input signal originates with a fiber optic, acoustical, or infrared source.

14. An apparatus for the generation of an information containing wave, comprising a function generator for generating a wave according to the formula selected from the group consisting of $$C(\theta) = \frac{\theta^3}{3!} - \frac{\theta^7}{7!} + \frac{\theta^{11}}{11!} - \frac{\theta^{15}}{15!} + \frac{\theta^{19}}{19!} - \frac{\theta^{23}}{23!} + \frac{\theta^{27}}{27!} \sum_{T=0} (-1)^T \frac{\theta^{4T+3}}{(4T+3)!}$$

$$S(\theta) = \frac{\theta}{1!} - \frac{\theta^5}{5!} + \frac{\theta^9}{9!} - \frac{\theta^{13}}{13!} + \frac{\theta^{17}}{17!} - \frac{\theta^{21}}{21!} + \frac{\theta^{25}}{25!} \sum_{T=0} (-1)^T \frac{\theta^{4T+1}}{(4T+1)!}$$

$$I(\theta) = \frac{\theta^2}{2!} - \frac{\theta^6}{6!} + \frac{\theta^{10}}{10!} - \frac{\theta^{14}}{14!} + \frac{\theta^{18}}{18!} - \frac{\theta^{22}}{22!} + \frac{\theta^{26}}{26!} \sum_{T=0} (-1)^t \frac{\theta^{4T+2}}{(4T+2)!}$$

$$R(\theta) = 1 - \frac{\theta^4}{4!} + \frac{\theta^8}{8!} - \frac{\theta^{12}}{12!} + \frac{\theta^{16}}{16!} - \frac{\theta^{20}}{20!} + \frac{\theta^{24}}{24!} \sum_{T=0} (-1)^T \frac{\theta^{4T}}{(4T)!}$$

wherein $\Theta$ is the angle in radians of the wave,

T is an integer from 1 to $\infty$ representing the truncation point of the function, and $C(\theta)$, $S(\theta)$, $I(\theta)$, and $R(\theta)$ represent the amplitude of the wave, an input device for receiving a data, and a combiner for combining the data input with the generated wave to form an information carrying wave.

* * * * *